US012697570B2

(12) United States Patent
Jones et al.

(10) Patent No.: US 12,697,570 B2
(45) Date of Patent: Aug. 4, 2026

(54) COALESCING MEDIA

(71) Applicant: Donaldson Company, Inc.,
Bloomington, MN (US)

(72) Inventors: Derek O. Jones, Andover, MN (US);
Bradly G. Hauser, Minneapolis, MN
(US); Vijay K. Kapoor, Eagan, MN
(US)

(73) Assignee: Donaldson Company, Inc.,
Bloomington, MN (US)

( * ) Notice: Subject to any disclaimer, the term of this
patent is extended or adjusted under 35
U.S.C. 154(b) by 664 days.

(21) Appl. No.: 17/975,877

(22) Filed: Oct. 28, 2022

(65) Prior Publication Data

US 2023/0133534 A1 May 4, 2023

Related U.S. Application Data

(60) Provisional application No. 63/273,639, filed on Oct.
29, 2021.

(51) Int. Cl.
B01D 29/11 (2006.01)
B01D 39/16 (2006.01)
B01D 39/18 (2006.01)

(52) U.S. Cl.
CPC .......... B01D 39/1623 (2013.01); B01D 29/11
(2013.01); B01D 39/18 (2013.01); *B01D*
*2201/12* (2013.01); *B01D 2201/18* (2013.01)

(58) Field of Classification Search
CPC .... B01D 2239/1258; B01D 2239/0478; B01D
2239/065; B01D 2239/0659;

(Continued)

(56) References Cited

U.S. PATENT DOCUMENTS 8,329,979 B2    12/2012   Bewick-Sonntag et al.
9,511,330 B2    12/2016   Yu et al.
(Continued)

FOREIGN PATENT DOCUMENTS

AU        2011220734 B2    12/2013
WO        2018017701 A1     1/2018
(Continued)

OTHER PUBLICATIONS

International Search Report and Written Opinion in PCT/US2022/
048162, mailed Apr. 20, 2023, 15 pages.
(Continued)

*Primary Examiner* — Allison G Fitzsimmons
(74) *Attorney, Agent, or Firm* — Mueting Raasch Group

(57) ABSTRACT

Some embodiments relate to a filter material for coalescing
a dispersed phase in a continuous phase. The filter material
has binder fibers and irregular rayon fibers distributed
among the binder fibers. The filter material lacks non-fibrous
resin. Some embodiments relate to a filter assembly. The
filter assembly has a particle filtration layer, a coalescing
layer downstream of the particle filtration layer, and a
growth media downstream of the coalescing layer. The
coalescing layer is coupled to the particle filtration layer.
The growth media has irregular rayon fibers and binder
fibers distributed among the irregular rayon fibers. The
growth media lacks non-fibrous resin.

16 Claims, 8 Drawing Sheets

(58) Field of Classification Search
CPC .... B01D 2239/1291; B01D 2239/0216; B01D 2239/0636; B01D 2239/064; B01D 2239/0208; B01D 2239/0407; B01D 2239/0464; B01D 2239/0492; B01D 2239/0613; B01D 2239/0681; B01D 2239/086; B01D 2239/1233; B01D 2239/02; B01D 2239/069; B01D 39/083; B01D 39/086; B01D 39/1692; B01D 39/163; B01D 39/1615; B01D 39/2017; B01D 39/2065; B01D 39/1623; B01D 39/18; B01D 29/11
See application file for complete search history.

(56) References Cited

U.S. PATENT DOCUMENTS

| | | | |
|---|---|---|---|
| 2009/0178970 A1 | 7/2009 | Stanfel et al. | |
| 2012/0152859 A1* | 6/2012 | Battenfeld | B01D 39/2017 |
| | | | 210/505 |
| 2014/0331626 A1 | 11/2014 | Nagy et al. | |
| 2016/0175751 A1* | 6/2016 | Chhabra | B01D 46/0027 |
| | | | 55/486 |
| 2019/0099301 A1 | 4/2019 | Viens et al. | |
| 2020/0002858 A1 | 1/2020 | Steach et al. | |
| 2020/0306099 A1 | 10/2020 | Viens et al. | |

FOREIGN PATENT DOCUMENTS

| | | |
|---|---|---|
| WO | 2020185864 A1 | 9/2020 |
| WO | 2021041210 A1 | 3/2021 |

OTHER PUBLICATIONS

Invitation to Pay Additional Fees in PCT/US2022/048162, mailed Feb. 17, 2023, 10 pages.

* cited by examiner

COALESCING MEDIA

PRIORITY

The present application claims the benefit of U.S. Provisional Patent Application Ser. No. 63/273,639, filed on Oct. 29, 2021, which is incorporated herein by reference in its entirety.

BACKGROUND

The technology disclosed herein generally relates to coalescing media. More particularly, the technology disclosed herein related to coalescing media for liquid hydrocarbon streams.

SUMMARY

The technology disclosed herein generally relates to a coalescing filter material. Some embodiments have improved coalescing performance in a liquid hydrocarbon stream compared to other types of coalescing media. Some embodiments of the filter material are relatively strong and can more easily and advantageously be subjected to automated manufacturing processes for formation into a filter assembly. In some embodiments the coalescing filter material of the present technology can advantageously increase the exposed surface area of rayon fibers and decrease the exposed surface area of non-rayon constituents in the filter material to improve coalescing performance. In some embodiments the coalescing filter material is a wet laid rayon filter material.

Some embodiments of the technology disclosed herein relate to a filter material. The filter material has binder fibers and irregular rayon fibers distributed among the binder fibers. The filter material lacks non-fibrous resin.

In some such embodiments, the filter material has an air permeability between 100-500 $ft^3$-$min^{-1}$-$ft^{-2}$ at 125 Pa. Additionally or alternatively, the filter material has fibrillated rayon fibers. Additionally or alternatively, the filter material has a thickness of at least 0.25 mm. Additionally or alternatively, the filter material is up to 70% by weight polyester fibers. Additionally or alternatively, the filter material is 30% to 75% by weight rayon fibers. Additionally or alternatively, the filter material lacks a support layer. Additionally or alternatively, the filter material lacks glass. Additionally or alternatively, the filter material has natural cellulose fibers. Additionally or alternatively, the irregular rayon fibers are multi-lobed rayon fibers. Additionally or alternatively, the irregular rayon fibers have a linear mass density from 1 den to 7 den. Additionally or alternatively, the filter material has a plurality of low-resistance flow paths through the filter material.

Some embodiments relate to a filter assembly. The filter assembly has a particle filtration layer and a coalescing layer downstream of the particle filtration layer. The coalescing layer is coupled to the particle filtration layer. A growth media is downstream of the coalescing layer. The growth media has irregular rayon fibers and binder fibers distributed among the irregular rayon fibers. The growth media lacks non-fibrous resin.

In some such embodiments, the particle filtration layer, coalescing layer, and growth media are pleated and collectively define a tubular structure. Additionally or alternatively, the particle filtration layer and coalescing layer are pleated and collectively define a tubular structure having a central opening, and the growth media forms a non-pleated tube within the central opening. Additionally or alternatively, the particle filtration layer and coalescing layer are pleated and collectively define a tubular structure having a central opening, and the growth media is pleated and defines a tubular structure, and a radial gap is defined between the growth media and the coalescing layer. Additionally or alternatively, a porous barrier is downstream of the growth media. Additionally or alternatively, the porous barrier forms a tubular structure. Additionally or alternatively, the growth media has an air permeability between 100-500 $ft^3$-$min^{-1}$-$ft^{-2}$ at 125 Pa. Additionally or alternatively, the growth media has fibrillated rayon fibers. Additionally or alternatively, the growth media has a thickness of at least 0.4 mm.

Additionally or alternatively, the growth media is up to 70% by weight polyester fibers. Additionally or alternatively, the growth media is 40% to 75% by weight rayon fibers. Additionally or alternatively, the growth media lacks a support layer. Additionally or alternatively, the growth media lacks glass. Additionally or alternatively, the growth media comprises natural cellulose fibers. Additionally or alternatively, the irregular rayon fibers are multi-lobed rayon fibers. Additionally or alternatively, the irregular fibers have a linear mass density from 1 den to 7 den. Additionally or alternatively, the growth media defines a plurality of low-resistance flow paths through the growth media.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

Figure 1:
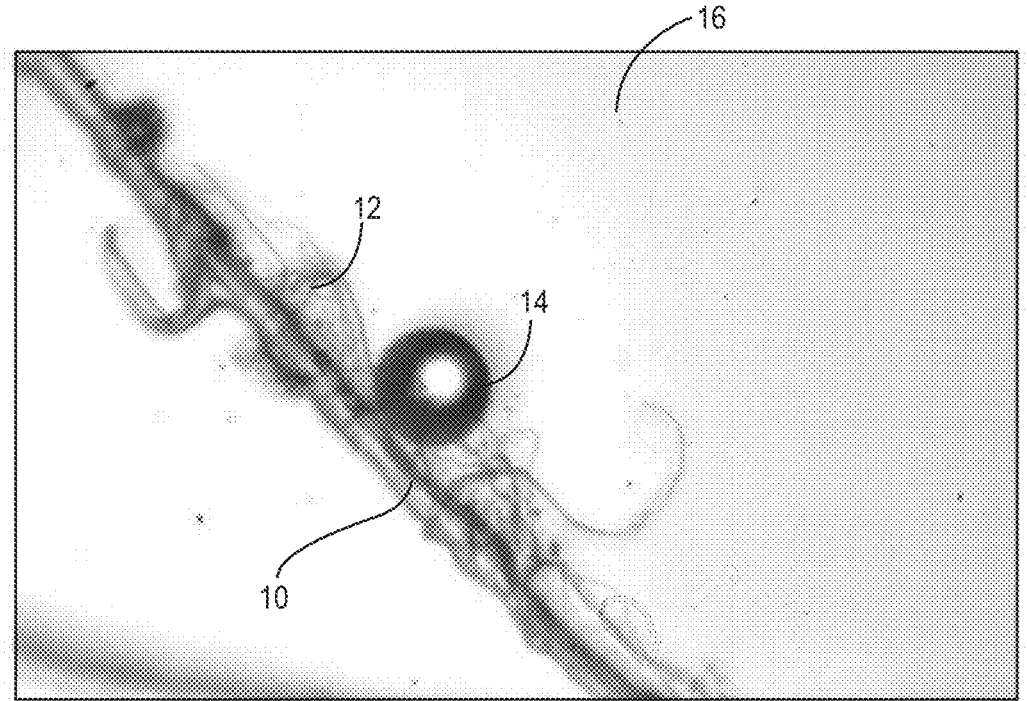
FIG. 1 is an SEM (scanning electron microscope) image depicting fibers of filtration media consistent with the technology disclosed herein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The filter material disclosed herein is configured to coalesce a dispersed phase (such as entrained air or water) from a continuous phase (such as a liquid hydrocarbon). The filter material disclosed herein is generally configured for use in liquid hydrocarbon filtration systems. In some implementations, the filter material is configured to coalesce water from a liquid hydrocarbon stream, such as a fuel stream. In some implementations the filter material is configured for deaeration in a liquid hydrocarbon stream, such as an oil stream. The filter material disclosed herein is growth media, meaning that the filter material is configured to grow the droplets or pockets of the dispersed phase. Such growth can be to facilitate the removal of the dispersed phase from the continuous phase.

In various embodiments, the filter material is configured to be positioned downstream of a liquid hydrocarbon filter assembly, where the liquid hydrocarbon filter assembly is configured to remove contaminants from a liquid hydrocarbon. Contaminants can include particles, entrained water, and entrained air. In various embodiments, the filter material is configured to be positioned downstream of a liquid hydrocarbon filter assembly that includes coalescing media.

Definitions

As used herein, unless indicated otherwise, pore size (for example P10 and P90) and ratios of pore sizes (for example, P90/P10) are determined using capillary flow porometry. Capillary flow porometry may be performed using a continuous pressure scan mode. It may be useful to use silicone oil, having a surface tension of 20.1 dynes/cm and a wetting contact angle of 0, as a wetting liquid. The sample may initially be tested dry, varying low pressure to high pressure, and then tested wet, again varying low pressure to high pressure. The test is performed at ambient temperature conditions (for example, 20° C. to 25° C.). 256 data points may be collected across the range of the scan of the pressures for both the dry curve and the wet curve. Typically, no tortuosity factor and/or a shape factor will be used (that is, for comparison to other test methods that use an adjustment factor, a factor equal to 1 may be used).

As used herein, a value P(x %) is the calculated pore size when the wet curve is equal to (100-x) % of the dry curve, as determined using the methodology described herein. Although a calculated value, this can be understood as representing the point at which x % of the overall flow through the layer passes through pores of that size or below. For example, P10 represents the diameter of a pore at which 10% of the fluid is flowing through pores of that diameter or less and P95 represents the diameter of a pore at which 95% of the fluid is flowing through pores of that diameter or less.

"Binder fiber" as used herein refers to a material structured as a filament or thread having at least one thermoplastic binder polymer constituent that is configured to bind the fibers in the filter material.

"Fibrillated" fiber is defined herein as fibers that have been processed to form a branched structure of smaller fibrils.

"Irregular," when used to characterize a fiber, is used herein to mean that the cross-sections of each of the fibers (perpendicular to the length of the fiber), along the length of the fiber, has a portion of the fiber perimeter that is concave.

A "lobed" fiber is used herein to mean that, in a cross-section perpendicular to the length of the fiber, the fiber has a projection (or lobe) extending outward from another portion of the fiber.

"Machine direction tensile strength" is the peak strength of a sample material measured with a tensile tester in accordance with TAPPI specification T494os-13. 25.4 mm×152.4 mm samples of filter material are cut such that the machine direction extends in the elongate direction of the sample. The tensile tester is set to move 50.8 mm per minute. The tensile strength is disclosed in N/cm, which is the units of force per unit width.

"Burst strength" of a sample material is measured in accordance with TAPPI T403 (2015) and ASTM D774 (2007) using a TMI 13-60-00 EC 35 Burst Tester from Testing Machines, Inc., based in New Castle, Delaware.

"Gurley stiffness" measures the force required to bend a sheet of material. The Gurley stiffness is calculated using a Gurley stiffness tester meeting industry standards TAPPI #T543 OM-16 (2016) and ASTM D6125-97 (2007).

"Natural cellulose fibers" is used herein to refer to cellulose fibers that maintain their original structure from the point of harvesting. Natural cellulose fibers are non-regenerated fibers, where "regenerated fibers" are fibers that are chemically and/or physically processed to break down the original fiber structure and then reconstituted to have a new fiber structure. Examples of regenerated cellulose fibers include rayon and viscose.

"Air permeability" refers to the quantity of air ($ft^3$-$min^{-1}$-$ft^{-2}$) that will flow through a filter medium at a pressure drop of 125 Pa (about 0.5 inches of water). In general, permeability, as the term is used, is assessed by the Frazier Permeability Test according to ASTM D737 using a Frazier Permeability Tester available from Frazier Precision Instrument Co. Inc., Gaithersburg, Maryland or a TexTest 3300 or TexTest 3310 available from Advanced Testing Instruments Corp (ATI), Spartanburg, So. Carolina 29301.

Filter Material Configuration

The filter material disclosed herein generally is a sheet of mixed and bonded fibers. In various embodiments, the filter material has binder fibers and rayon fibers. In some embodiments the filter material is limited to binder fibers and rayon fibers and lacks any other constituents. In some embodiments, the filter material is limited to binder fibers, rayon fibers, and natural cellulose fibers and lacks any other constituents. In examples, the binder fibers are bi-component fibers. The bi-component fibers can be polyester bi-component fibers. In examples, the rayon fibers include irregular rayon fibers. In examples, the rayon fibers include fibrillated rayon fibers. The fibers in the filter material are described in more detail below.

In various embodiments the filter material lacks glass fibers, meaning that the glass fibers are less than 3%, less than 1%, or less than 0.5%, or 0% of the filter material by weight. Such a configuration may be desirable in implementations where the filter material is the downstream-most filter media in a filtration system and where glass fibers may negatively interact with downstream system components. In some embodiments, the filter material is a single layer of material. In some implementations of the filter material, however, it may be desirable to layer multiple layers of the filter material in a filter assembly.

In some embodiments, the filter material generally lacks a support layer such as a scrim layer. A "support layer" is defined herein as an individual layer of material that is configured to be coupled to the filter material, where the primary function of the support layer is to impart structural integrity to the filter material rather than filtration (including coalescing) functionality. A support layer is generally characterized by a high air permeability relative to the coalescing layer. Support layers generally have an air permeability of greater than or equal to 200 $ft^3/min$-$ft^2$. In various examples support layers have an air permeability of greater than or equal to 400 $ft^3/min$-$ft^2$. Some support layers have an air permeability of less than or equal to 1000 $ft^3/min$-$ft^2$.

In various embodiments, the sheet of filter material has variations in flow resistance through the sheet across the surface area of the sheet. The sheet can define a plurality of discrete relatively low-resistance flow paths through the sheet where the fiber density in the flow path is lower than adjacent locations through the sheet. The relatively low-resistance flow paths will each generally have a length extending through the thickness of the media and a cross-dimension perpendicular to the length (such as diameter or a diagonal measurement). Such low-resistance flow paths can be formed, at least in part, during the formation of the sheet of filter material itself through the use of specific types of fibers that are described in more detail below. The low resistance flow paths can be quantified in terms of pore size distribution, for example, where a large pore size distribution represents relatively higher variations in flow resistance across the media. Pore size distribution is described in more detail, below.

The presence of relatively low-resistance flow paths through the sheet of filter material may advantageously facilitate coalescing and growth of the dispersed phase (such as water or air) in some implementations. The flow paths can be formed in a pattern across at least a portion of the sheet of filter material, in some examples. In some embodiments, the flow paths are not generally visible to the naked eye.

In some embodiments, low-resistance flow paths are, at least in part, defined by perforations formed through a narrow puncture or cut through the media, such as by poking a needle through the media. Forming the puncture may cut or tear through one or more fibers at the location of the puncture. As such, one or more fiber ends may be positioned at or adjacent to the puncture location. The region of the filter material forming the low-resistance flow path is generally irregular and uneven. In various embodiments, the region of the filter material forming the low-resistance flow path is not smooth, such as if the flow path had been formed through melting/burning operations such as laser ablating or the like. The fiber ends and fibers defining the perforation locations may advantageously increase the interaction between the fibers and the fluid and define a flow path for the coalescing dispersed phase.

Filter Material Properties

Filter material disclosed herein can have a basis weight generally ranging from 40 $g/m^2$ to 150 $g/m^2$ and, in some embodiments range from 100 $g/m^2$ to 150 $g/m^2$. The basis weight of the filter material can depend on the specific configuration of the material when implemented in a particular filter element. For example, if the filter material is configured to be wrapped around a core in a coiled configuration to form multiple layers around the core, the basis weight of the single layer of filter material may be closer to 40 $g/m^2$ to 70 $g/m^2$ while the combination of layers of filter material disposed around the core may have a combined basis weight ranging from 100 $g/m^2$ to 150 $g/m^2$. In some implementations where the filter material is co-pleated with other layers of media, it may also be desirable for the filter material to have a comparatively low basis weight ranging from 40 $g/m^2$ to 70 $g/m^2$. A relatively low basis weight can increase the flexibility of the filter material which may be advantageous for various filter assembly manufacturing processes including co-pleating or wrapping, as examples.

In various embodiments, the air permeability of the filter material ranges from 100 $ft^3/min$-$ft^2$ to 500 $ft^3/min$-$ft^2$, where the air permeability is the Frazier permeability. In some embodiments the air permeability ranges from 130 $ft^3/min$-$ft^2$ to 300 $ft^3/min$-$ft^2$ or 130 $ft^3/min$-$ft^2$ to 200 $ft^3/min$-$ft^2$.

The filter material can have a thickness ranging from 0.2 mm to 2.0 mm or 0.5 mm to 1.8 mm, where the thickness is measured at 1.5 psi (10.3 kPa). In some embodiments the filter material has a thickness of at least 0.25 mm. In some embodiments the filter material has a thickness of at least 0.4 mm.

A further characteristic of the filter material is that it may have a relatively low solidity. As used herein, "solidity" is the solid fiber volume divided by the total volume of the filter material at issue, usually expressed as a percentage. In a typical implementation, solidity of the particle filter layer is less than 15 percent, more typically less than 12 percent, and more frequently less than 10 percent. In various embodiments the solidity of the filter material ranges from 5 percent to 9 percent.

The filter material can have a P10 value ranging from 5.0 $\mu$m to 20.0 $\mu$m, where the value of P10 reflects the diameter of a pore at which 10% of the fluid is flowing through pores of that diameter or less. The filter material can have a P95 value ranging from 75.0 $\mu$m to 200.0 $\mu$m. The value of P95 reflects the diameter of a pore at which 95% of the fluid is flowing through pores of that diameter or less. The P95/P10 ratio can range from 5 to 10, where a larger ratio of P95/P10, generally reflects a larger range of pore sizes with relatively larger pores being present. In some implementations, a filter material having a relatively larger range of pore sizes may have improved coalescing performance.

In some embodiments, the filter material consistent with the technology disclosed herein is relatively strong. Such a configuration may advantageously simplify manufacturing of the media. Such a configuration may advantageously allow omission of a support layer that may negatively interfere with performance of the filter material. For example, in some implementations the filter material has a machine direction tensile strength ranging from 10.0 N/cm to 40.0 N/cm. In some particular examples the machine direction tensile strength ranges from 15 N/cm to 30 N/cm. As another example, in some embodiments the filter material has a burst strength ranging from 150 kPa to 600 kPa. In some specific examples the burst strength ranges from 400 kPa to 600 kPa. As another example, in some embodiments the filter material generally has a Gurley stiffness in the machine direction ranging from 600 mg to 2500 mg. The Gurley stiffness can range from 1000 mg to 2500 mg or 1400 mg to 2300 mg in some specific implementations.

Binder Fibers

The binder fiber is generally configured to provide support for the other fibers in the filter material, and also can add improved handling, strength, and compression resistance to the filter material. In certain implementations the binder fiber also provides improved processability during furnish formulation, sheet or layer formation and downstream processing, including thickness adjustment, drying, cutting and filter element formation. The filter material can be formed, in part, through a heating process where the thermoplastic binder polymer at least partially melts and binds to abutting fibers in the fiber mix. The binder fiber can include a thermoset polymer, in various embodiments.

Binder fibers used herein will generally have a minimum melting point that is higher than the intended operating environment of the resulting filter material. In some embodiments all of the binder fibers in the formed filter material have a melting point that is at least 80° C., at least 90° C., or at least 100° C.

The use of binder fibers as disclosed herein may advantageously allow the omission of a non-fibrous resin as a binder in the filter material. Non-fibrous resin may have some disadvantages associated with some implementations of the current technology. For example, non-fibrous resin may disadvantageously form a film over fiber surfaces that may interfere with performance of the fibers and reduce the functional surface area of the fibers within the filter material. Non-fibrous resin may partially or completely fill pores in the filter material, which may interfere with the performance of the filter material by, for example, reducing the permeability of the filter material. Further, non-fibrous resin may cause lack of uniformity across the filter material due to migration of the resin to a particular location of the media layer. In various implementations the filter material consistent with the technology disclosed herein lacks non-fibrous resin, which is used herein to mean the filter media is less than 3%, less than 1%, less than 0.5%, or 0% of the filter material by weight.

The use of binder fibers may advantageously allow the omission of a support layer, such as a scrim layer, in a filter material consistent with the present disclosure. In particular, the binder fibers may be configured to impart sufficient strength and rigidity to the filter material such that a support layer would be unnecessary. A filter material lacking a support layer may advantageously have improved coalescence compared to filter material having a support layer. In the latter case, the support layer may negatively impact coalescence by reducing the growth of the dispersed phase or interfering with the clean release of the dispersed phase from the filter material. Furthermore, adding a support layer to the filter material adds manufacturing steps associated with at least coupling the support layer to other layers of the filter material. As such, omitting a support layer may advantageously simplify manufacturing of the filter assembly.

The binder fibers can generally be less than 70% of the weight of the filter material. In some embodiments the filter material has over 0% binder fibers by weight. In some embodiments the filter material has 15% to 45%, 20% to 50%, or 25% to 45% binder fibers. In some embodiments the binder fibers can include mono-component binder fibers such as nylon or polyester fibers. In some other embodiments the binder fibers can include bi-component fibers, which will now be discussed.

Bi-Component Fibers

In some embodiments, the binder fiber can incorporate one or more types of bi-component fibers. The bi-component fiber may include any suitable bi-component fiber or combination of bi-component fibers. The term "bi-component fiber" means a fiber having at least one thermoplastic binder polymer portion with a melting point and a second thermoplastic structural polymer portion with a different and higher melting point than the binder polymer portion. The physical configuration of these fibers is typically in a "side-by-side" or "sheath-core" structure. In side-by-side structures, the two thermoplastic polymer resins are typically extruded in a connected form in a side-by-side structure. Other fiber morphologies include lobed bicomponent fibers, wherein the tips of the fibers have lobes that are formed from a lower melting point polymer than the rest of the fiber. The lower melting polymer acts as a binder and the higher melting polymer acts as a structural material. In the sheath-core structure, the core contains the higher, structural fiber melting point and the sheath contains the lower, bonding layer melting point. In some embodiments, the bi-component fiber preferably has a sheath-core structure.

In some embodiments, the filter material consistent with the technology disclosed herein can have up to 70% bi-component fibers by weight. In some embodiments the filter material has over 0% bi-component fibers. In some embodiments the filter material has 15% to 45%, 20% to 50%, or 25% to 45% bi-component fibers.

The lower melting point polymer of the bi-component fiber may have a melting point such that during the thermal forming process the fiber is heated to a temperature such that the lower melting point polymer can fuse and bond the fibers into an intact web. Typically, the higher melting point polymer of the bi-component fiber is a material that provides structural integrity to the web and does not melt at either thermal bonding temperatures or at use temperatures. As such, the fiber web is heated to a temperature above the melting point or glass transition temperature of the lower melting point polymer and below the melting point or glass transition temperature of the higher melting point polymer. In embodiments, melt fusing is accomplished when the molten or softened fiber components contact other bicomponent fibers, as well as any other fibers and additives within the formed filter material.

For example, in one embodiment the bi-component fiber may include a lower melting point polymer having a melting point of at least 100° C., at least 120° C., or at least 140° C. In some embodiments, the lower melting point polymer has a melting point in the range of 140° C. to 160° C. The bi-component fiber may further include a higher melting point polymer having a melting point of at least 235° C. or at least 240° C. In some embodiments, the higher melting point polymer has a melting point in the range of 240° C. to 260° C.

Without wishing to be bound by theory, it is believed while the relatively low melting point weight polymer of the bi-component fiber melts under sheet, media, or filter forming conditions to bind the bi-component fiber, and other fibers present in the media into a mechanically stable sheet, media, or filter, the higher melting polymer of the bi-component fiber helps to maintain the low solidity structure of the media during the thermal forming process because the higher melting polymer does not melt and, consequently, holds the other fibers in the web apart.

In some embodiments, the media may include a first bi-component fiber and a second bi-component fiber. The inclusion of a second bi-component fiber having different features than the first bi-component fiber may improve the ease of forming the fibers into a sheet, layer, and/or filter medium.

For example, the first bi-component fiber may include a lower melting point polymer having a melting point of at least 100° C., at least 120° C., or at least 140° C. In some embodiments, the lower melting point polymer has a melting point in the range of 140° C. to 160° C. The first bi-component fiber may further include a higher melting point polymer having a melting point of at least 235° C. or at least 240° C. In some embodiments, the lower melting point polymer has a melting point in the range of 235° C. to 260° C. The first bi-component fiber can range from 0% to 30% of the filter material by weight. In some embodiments, the first bi-component fiber can range from 10% to 20% of the filter material by weight.

In such an example, the second bi-component fiber may include a lower melting point polymer having a melting point of at least 80° C., at least 90° C., or at least 100° C. In some embodiments, the lower melting point polymer has a melting point in the range of 90° C. to 120° C. or 105° C. to 115° C. The second bi-component fiber may further include a higher melting point polymer having a melting point of at least 200° C., at least 220° C. or at least 240° C. In some embodiments, the higher melting point polymer has a melting point in the range of 235° C. to 260° C. The second bi-component fiber can range from 0% to 40% of the filter material by weight. In some embodiments, the second bi-component fiber can range from 10% to 20% of the filter material by weight. In yet another example the second bi-component fiber can range from 30% to 45% of the filter material by weight.

The bi-component fiber typically has a fiber diameter in a range of 5 μm to 50 μm, often in a range of 10 μm to 20 μm. The bi-component fiber typically has a length in a range of 0.1 millimeters (mm) to 20 mm, often have a length of about 0.2 mm to about 15 mm. The bi-component fiber can have a linear density ranging from about 1 dtex to 5 dtex or 2 dtex to 4 dtex.

The bi-component fiber can be made from any suitable materials including, for example, a variety of thermoplastic materials including polyolefins (such as polyethylenes, polypropylenes, etc.); polyesters (such as polyethylene terephthalate, PET, poly-butylene terephthalate, PBT, etc.); nylons (such as nylon 6, nylon 6,6, nylon 6,12, etc.). Any thermoplastic that can have an appropriate melting point can be used in the bi-component fiber while higher melting polymers can be used in the higher melting portion of the fiber. The bi-component fiber can have, for example, a PET/PET or nylon 6/nylon 6,6 structure with PET/components of different melting points or nylon.

Exemplary bi-component fibers can include polyolefin/polyester (sheath/core) bi-component fibers whereby the polyolefin, e.g. polyethylene sheath, melts at a temperature lower than the core, for example, polyester or polyester/polyester or nylon/nylon materials. Typical thermoplastic polymers include polyolefins, e.g. polyethylene, polypropylene, polybutylene, and copolymers thereof; polytetrafluoroethylene; polyesters, for example, polyethylene terephthalate; vinyl acetates, for example, polyvinyl acetate, polyvinyl chloride acetate; polyvinyl butyral; acrylic resins, for example, polyacrylate, and poly methyl acrylate, poly methyl methacrylate; polyamides, for example, nylon; polyvinyl chloride, polyvinylidene chloride; polystyrene; polyvinyl alcohol; polyurethanes; cellulosic resins, for example, cellulosic nitrate, cellulosic acetate, cellulosic acetate butyrate, ethyl cellulose, etc.; copolymers of any of the above materials, for example, ethylene-vinyl acetate copolymers, ethylene-acrylic acid copolymers, styrene-butadiene block copolymers, Kraton rubbers and the like.

Irregular Rayon Fibers

In various embodiments, the filter material consistent with the technology disclosed herein has irregular rayon fibers distributed among the binder fibers. The surface properties of rayon may advantageously improve coalescence in liquid hydrocarbon filtration. Furthermore, the irregular shape of the rayon fibers may provide a relative reduction in the solidity of the media and may provide a relative increase in the average pore size of the filter material, which may advantageously improve the ability of the filter material to coalesce. The irregular shape of the rayon fibers may also increase the relative roughness of the surface of the fibers, which may advantageously enhance the coalescing properties of the fibers.

The filter material can generally be at least 35%, 40% or 50% by weight of irregular rayon fibers. The filter material generally has less than or equal to 65% or 60% of irregular rayon fibers by weight. In some embodiments, the filter material has from 50% to 60% of irregular rayon fibers by weight. The irregular rayon fibers can have a linear mass density from 1 den (denier) to 7 den or 2 den to 5 den. The irregular rayon fibers can have a length ranging from 1 mm to 10 mm, 3 mm to 8 mm, or 5 mm to 7 mm, in embodiments.

The irregular rayon fibers are generally not fibrillated and may have a relatively large cross-section compared to the fibrillated fibers. In some embodiments, the irregular rayon fibers are lobed rayon fibers. The irregular rayon fibers can be multi-lobed rayon fibers such as bi-lobal, trilobal quadlobal, tetralobal, hexsalobal, and even octolobal rayon fibers. In one specific example, the irregular rayon fibers are trilobal rayon fibers. Other irregular fiber cross-sectional shapes are certainly contemplated, however, such as deepgrooved fibers.

Fibrillated Rayon Fibers

In various embodiments, the filter material includes fibrillated rayon fibers. As mentioned above, the surface properties of rayon may advantageously improve coalescence in liquid hydrocarbon filtration such as by encouraging growth of the dispersed phase within the media and release of the dispersed phase from the media. Fibrillated rayon fibers may generally have a relatively high surface area that functions as a coalescer of a dispersed phase, such as water or air, within a liquid hydrocarbon stream, such as fuel or oil. The fibrillated rayon fibers in combination with the irregular rayon fibers may advantageously create pores having a relatively wide pore size distribution in the filter material, which may improve coalescence of the dispersed phase. Additionally, during the manufacturing process the fibrillated fibers may become entangled, which may advantageously contribute to increased strength of the filter material.

In some embodiments, the fibrillated rayon fibers may have an affinity to the outer surface of the binder fibers and thus cover exposed surfaces of the binder fibers. Such a configuration may limit contact between the surface of the binder fibers and the liquid to be filtered, which may advantageously limit the ability of the binder fibers to interfere with coalescence of the rayon. FIG. 1 is an SEM image showing one example where a binder fiber 10 having a polyester outer surface is thermally bonded to fibrillated rayon fibers 12 (Lyocell). The fibrillated rayon fibers 12 wrap around the binder fiber 10 and become entangled such that a water droplet 14 in fuel 16 has limited or no contact with the binder fiber 10. In this example the binder fiber is a bi-component binder fiber having a sheath-core structure with a polyester inner core and a polyester outer sheath.

The fibrillated rayon fibers may be 5% to 15% of the weight of the filter material. In some embodiments, the fibrillated rayon fibers can be 5% to 10% of the weight of the filter material. In some embodiments the fibrillated rayon fibers have fiber diameters ranging from 50 to 1000 nanometers or 50 to 500 nanometers. The fibrillated rayon fibers can have a linear mass density of 0.0001 den-0.0007 den. In one example implementation, the fibrillated rayon fibers are fibrillated Lyocell fibers sourced from Engineered Fibers Technology, LLC of Shelton, Connecticut.

Natural Cellulose Fibers

In some embodiments, the filter material has a relatively low amount of natural cellulose fibers. Natural cellulose fibers may advantageously improve the strength of the wet fiber slurry for wet laid manufacturing process steps of the filter material. Generally, the filter material is less than 10% natural cellulose fibers by weight. In some embodiments the filter material is 6% or less natural cellulose fibers by weight. In some embodiments, however, the filter material lacks natural cellulose fibers, meaning that the filter material is less than 3%, less than 1%, less than 0.5%, or 0% natural cellulose fibers by weight. In some embodiments it may be desirable for the filter material to have 0% natural cellulose fibers, such as in implementations where natural cellulose fibers may interfere with the performance of the filter material.

Manufacturing Processes

In making the filter material, in certain embodiments a fiber mat is formed using wet processing. The mat is heated to melt the binder fibers to form the media by internally adhering the fibers. The binder fibers bind with each other and with the rest of the fibers in the fiber mat to fuse into a mechanically stable media.

The filter material is typically made using papermaking processes. However, in some other embodiments the media can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, and remove the fluid aqueous components to form a wet sheet.

In example wet laid processing, the media is made from an aqueous furnish comprising a dispersion of fibrous material in an aqueous medium. The aqueous liquid of the dispersion is generally water but may include various other materials such as pH adjusting materials, surfactants, defoamers, flame retardants, viscosity modifiers, media treatments, colorants and the like. The aqueous liquid is usually drained from the dispersion by positioning the dispersion onto a screen or other perforated support retaining the dispersed solids, and draining the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the binder fiber, resin or other portion of the formed material. The melt material binds the component into a layer.

A fiber slurry containing the materials is typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. For a commercial scale process, the bicomponent mats are generally processed through the use of papermaking-type machines such as commercially available Fourdrinier, wire cylinder, Stevens Former, Roto Former, Inver Former, Venti Former, and inclined Delta Former machines.

In some implementations an inclined Delta Former machine is utilized. A bicomponent mat can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be passed through a drying section which dries the mat and cures any additives and heats the binder fibers to thermally bond the filter material. The resulting mat may be collected in a large roll for future processing, for laminating to other media layers, or for forming into filter elements.

Test Results

Fuel-Water Separation Efficiency Test

Sample filter material was tested for fuel-water separation efficiency. Each sample of filter material (180 mm by 150 mm) was wrapped around a perforated aluminum cylinder (59 mm diameter by 150 mm height) to form a filter. The aluminum cylinder was used as a rigid core giving the filter material structural integrity. A two-part epoxy glue was used to seal the ends of the filter material to the core and the edge seam. The wrap and core were then attached and sealed with two-part epoxy glue to plastic filter endcaps. Both endcaps have a central hole to allow fluid flow. The bottom endcap allows the denser coalesced water phase to settle with gravity into a drainable collection bowl. The top endcap allows for fuel flow to exit the filter.

To measure fuel water separation efficiency the prototype filters were tested on a bench built to specifications for ISO 16332:2018. Deviations from the standard test procedure are listed herein. Flow through the test filter was set to 4.0 liters per minute (L/min). Challenge droplet size was adjusted to the desired mean emulsion diameters (90 μm, 75 μm, and 45 μm) using an orifice plate with an adjustable needle valve. The droplet size distribution of upstream free water was determined using a commercial Malvern Instruments (Malvern, United Kingdom) Insitec SX droplet size analyzer with an attached wet flow cell. Free water content upstream and downstream of the filter was measured using commercial Litronic-FMS/RMH12 sensors (Liebherr-Mischtechnik GmbH, Germany). The water was injected using an adjustable peristaltic pump. The water injection flow rate was adjusted to target 1500 parts per million (ppm) free water. The wrap sample was tested for 30 minutes at each of the target mean droplet diameters starting with the 90 μm challenge diameter, followed by 75 μm, then 45 μm. The water separation efficiency reported is the average efficiency [(Upstream Free Water-Downstream Free Water)/Upstream Free Water] over the 30-minute test at each challenge diameter.

Ultra-Low Sulfur Diesel from Chevron Phillips Chemical (The Woodlands, Tex.) was used as a base fuel. 10% (by volume) soy biodiesel (Renewable Energy Group (REG), Inc., Mason City, Iowa) was added to the base fuel to form a fuel mixture. The interfacial tension of the fuel mixture was 21.0+−0.2 dynes per centimeter, as determined by pendant drop method. The same batch of fuel mixture was used for all testing.

Fuel water separation efficiency at each mean droplet size was tested for each of the filter material samples, which is shown in Table 1, below. Each of the samples were thermally bonded wet laid media lacking non-fibrous resin. Each of the samples of filter material tested had varying weight percentages of trilobal rayon fibers ("TL Rayon"), 0.8 den rayon fibers having a round cross section ("0.8d Reg. Rayon"), fibrillated rayon fibers ("Fibr. Rayon"), polyester ("PET"), and natural cellulose ("Nat. Cell."). Each of the samples of filter material tested had varying basis weights ("Basis Wt.") and permeabilities ("Perm.").

TABLE 1

| Sample | % TL Rayon | %0.8d Reg. Rayon | % Fibr. Rayon | Total % Rayon | % PET | % Nat. Cell. | Basis Wt. (g/m²) | Perm. (ft³/min-ft²) | 90 μm (%) | 75 μm (%) | 45 μm (%) |
|---|---|---|---|---|---|---|---|---|---|---|---|
| 1 | 0 | 0 | 0 | 0 | 75 | 25.0 | 59.2 | 201 | 41.2 | 38.0 | 36.1 |
| 2 | 16.7 | 33.3 | 0 | 50 | 33.3 | 16.7 | 117 | 72.5 | 69.1 | 66.2 | 60.4 |
| 3 | 12.5 | 25.0 | 0 | 37.5 | 62.5 | 0 | 139 | 139 | 58.5 | 51.8 | 41.3 |
| 4 | 0 | 50.0 | 0 | 50 | 50.0 | 0 | 124 | 110 | 57.6 | 49.0 | 42.5 |
| 5 | 50.0 | 5.6 | 5.6 | 61.2 | 38.9 | 0 | 117 | 68.0 | 48.8 | 63.5 | 64.6 |
| 6 | 56.3 | 0 | 6.3 | 62.6 | 37.5 | 0 | 116 | 117 | 86.1 | 91.7 | 79.7 |

Figure 5:
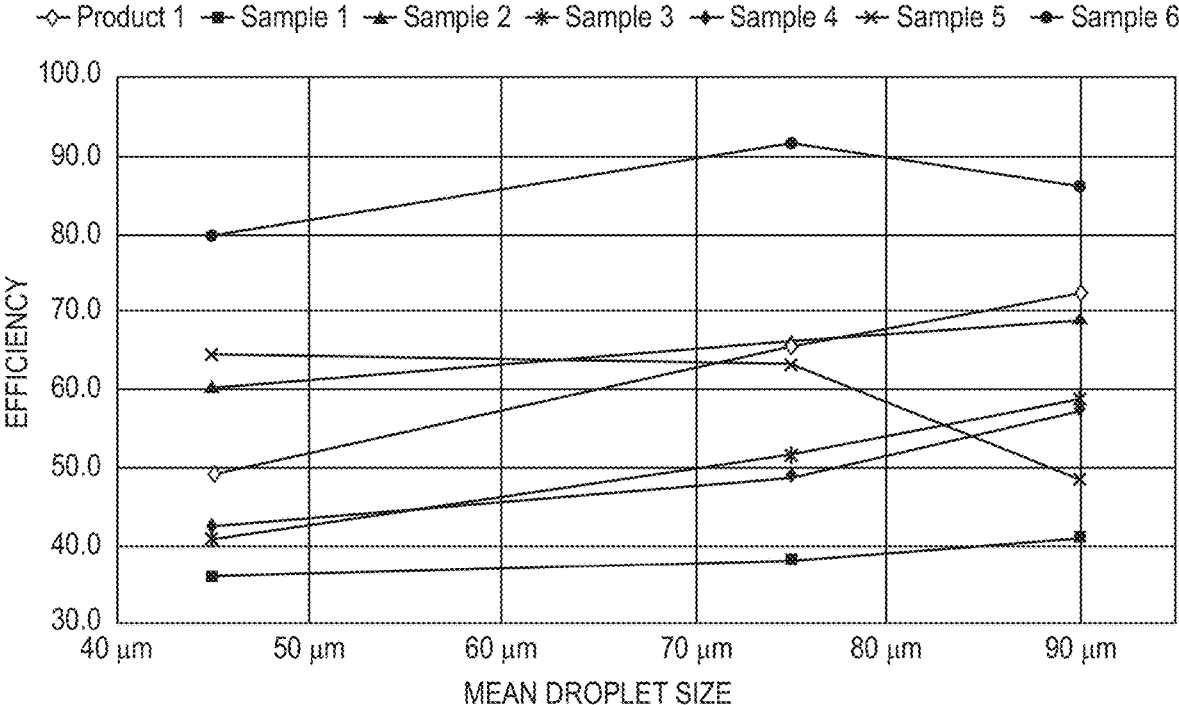
FIG. 5 is a graph depicting test results.

The fuel water separation efficiency at each of the mean droplet sizes for each of the samples referenced in Table 1 is depicted in the graph of FIG. 5. While it was generally expected that filter material having more rayon fibers would have higher fuel water separation efficiency than filter material having less rayon, it was surprising that the combination of types of rayon fibers appeared to impact the fuel water separation efficiency. Compare, for example, Sample 5 and Sample 6, where Sample 5 has 1.4% less rayon fibers and 1.4% more polyester fibers than Sample 6, but Sample 5 had notably lower fuel water separation efficiency. It is believed that the significantly increased permeability of Sample 6, compared to Sample 5 resulting from replacing the non-irregular and non-fibrillated rayon fibers of Sample 5 with the tri-lobal (irregular) and fibrillated rayon fibers of Sample 6, may advantageously result in increased water separation efficiency. It is believed that the increased surface area of the rayon fibers of Sample 6 (via the relatively high percentage and combination of fibrillated fibers and trilobal fibers) compared to the other Samples may advantageously result in improved water separation efficiency of the filter material.

The fuel water separation efficiency of the samples are also compared to a commercially available filter material product (Product 1) in FIG. 5. Product 1 is an air laid media constructed of 30% polyester fibers and 70% non-irregular, non-fibrillated rayon fibers by weight. Product 1 lacks a non-fibrous resinous binder. Furthermore, the polyester fibers of Product 1 are not binder fibers and Product 1 lacks binder fibers and in particular has 0% binder fibers by weight. Rather, the polyester and rayon fibers are bonded through a needle-punch process that entangles the constituent fibers. Product 1 has a basis weight of 102+/−10 g/m², a thickness of 1.4+/−0.14 mm, and a machine direction tensile strength of 0.72 N/cm-7.2 N/cm. The machine direction tensile strength was measured consistently with the procedure defined above in the "Definitions" section, except that the width of the sample in the cross-machine direction was about 50.8 mm (double that of the procedure described above) to allow successful execution of the test procedure given the relative weakness of the material. The burst strength and the Gurley stiffness of Product 1 are both too low to measure with the test procedures disclosed herein.

It is believed that the relatively low solidity and low pressure drop of Product 1 can be desirable for coalescing performance because openings between the fibers in the media can facilitate growth of the dispersed phase. However, without wishing to be bound by theory, it is believed that the relative weakness of Product 1 may allow the media to collapse with increasing fluid flow, leading to increased solidity, reduction of the pore size, and increased pressure restriction during use, which may limit coalescing performance compared to filter material consistent with the technology disclosed herein. Further, the relatively low strength of the material of Product 1 may be undesirable in many automatic manufacturing processes, where weak and compressible media can present a challenge to form the media into a filter element.

Filter Material Performance Under Loading

A series of prototype filter assemblies were constructed and fitted to Class 8 over-road diesel engine trucks. The filter assemblies had identical filters, but different coalescing growth wraps positioned downstream of the filters for comparison purposes. The Comparative Wraps are identical wraps constructed of Product 1, described above. The Example Wraps are identical wet-laid rayon/binder fiber filter material consistent with the technology disclosed herein. The Example Wraps had 38% PET fibers, 7% fibrillated Lyocell fibers, and 55% trilobal rayon fibers. The Comparative Wraps and the Example Wraps were installed in filter assemblies having the same construction and were used in the same type of truck. However, the environments within which the trucks were operated were different, and so the filter assemblies were exposed to different conditions.

The trucks having the installed filter assemblies were run between 3,000 and 65,000 miles. The filter assemblies were removed from trucks at different mileage intervals and tested for fuel water separation efficiency. Test protocols follow ISO16332:2018 with mean challenge droplet diameter set to 150 μm. Prior to testing, the differential pressure of each filter assembly was measured, where a higher differential pressure results from relatively higher contaminant loading on the filter assembly. Among the filter assemblies that measured between 5 kPa and 15 kPa differential pressure, which correlates with a filter assembly loaded with contaminants but still within its useful life, the filter assemblies having the Comparative Wrap had an average fuel water removal efficiency of 80.8%, while the filter assemblies having the Example Wrap had an average fuel water removal efficiency of 91.2%.

For the fuel water removal efficiency testing, High Conductivity Ultra-Low Sulfur Diesel from Corrigan Oil (Brighton, Mich.) was used as a base fuel. 10% (by volume) soy biodiesel from Corrigan Oil (Brighton, Mich.) was added to the base fuel to form a fuel mixture. The interfacial tension of the fuel mixture was 14.0+−0.5 dynes per centimeter, as determined by pendant drop method. The same batch of fuel mixture was used for all testing.

Filter Assemblies

The filter assemblies consistent with the technology disclosed herein generally incorporates filter material described herein above. The filter material is generally configured to be positioned downstream of other media within the filter assembly. In some embodiments, the filter assembly can be a single filter element incorporating the filter material discussed above. In such an example, the filter material is positioned in the downstream-most position relative to other media within the filter assembly. In some other embodiments, the filter assembly can be multiple filter elements, where the filter material consistent with the present disclosure is incorporated in a second filter element that is configured to be positioned downstream of a first filter element. In such an example, the first filter element can have a particle filtration layer and a coalescing layer.

The filter assemblies consistent with the technology disclosed herein generally have a filter material, a coalescing layer downstream of the filter material, and a growth media downstream of the coalescing layer. The growth media is consistent with filter material described above.

Filter Assembly Configurations

Figure 2A:
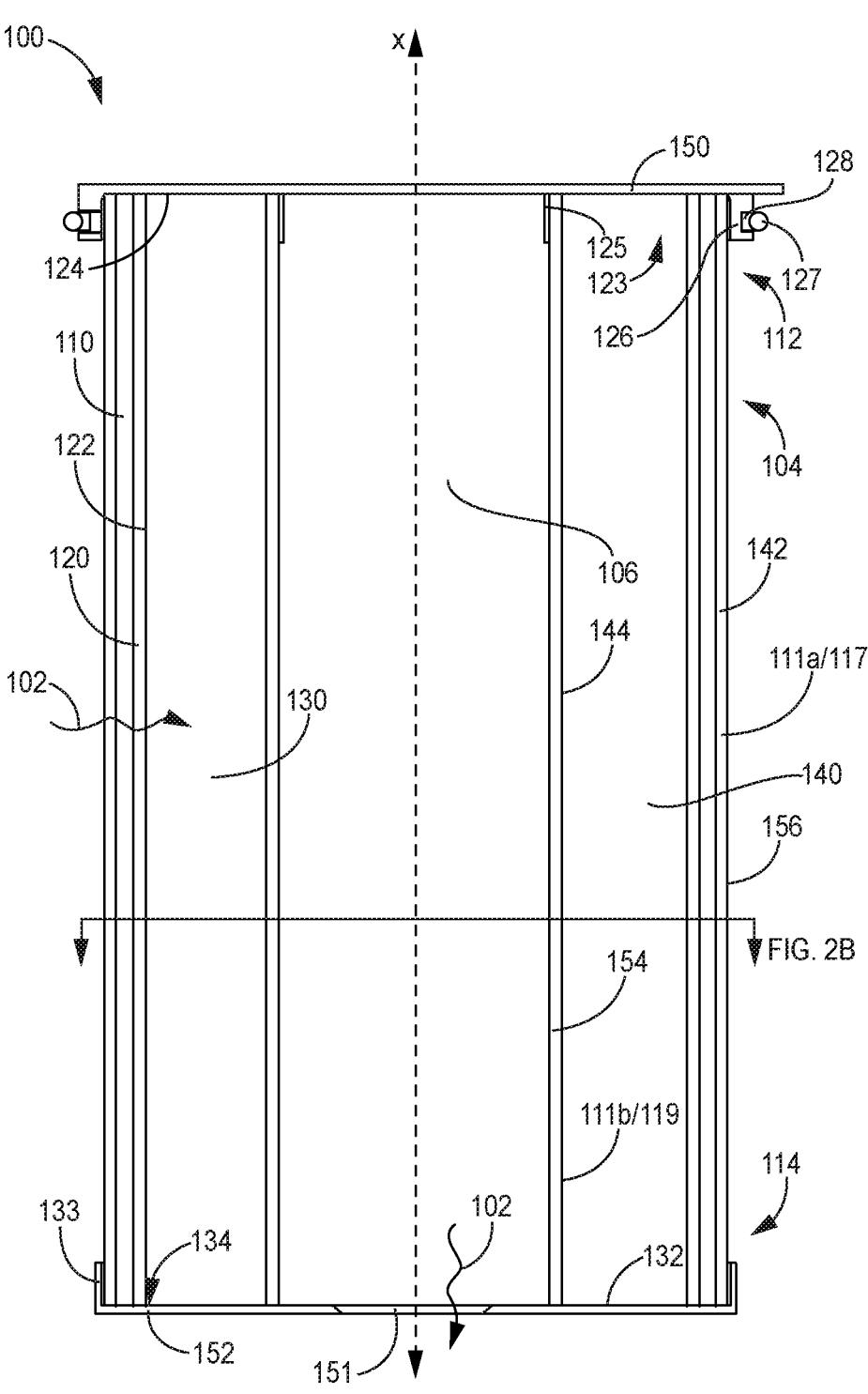
FIG. 2A is a first cross-sectional view of a first example filter assembly consistent with some embodiments.
Figure 2B:
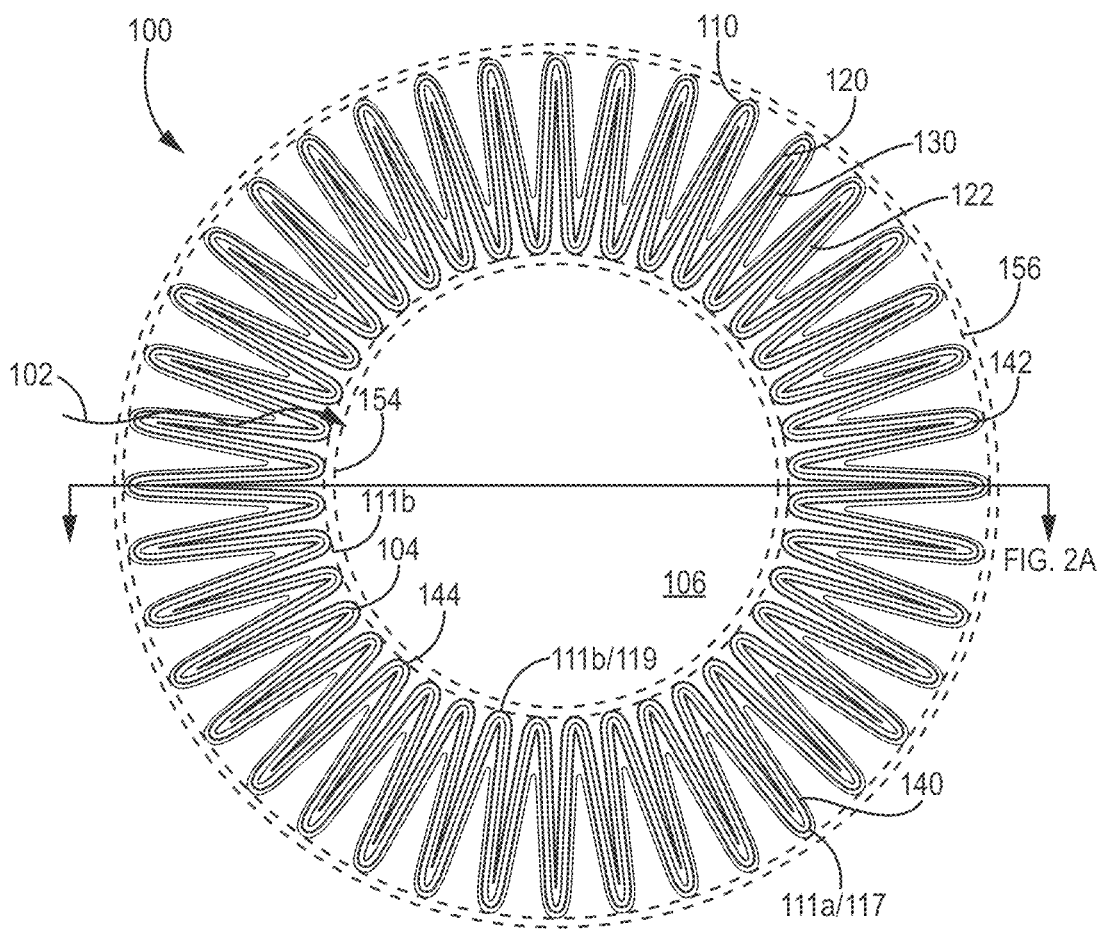
FIG. 2B is a second cross-sectional view consistent with the first example filter assembly of FIG. 1.

FIGS. 2A and 2B depict an example filter assembly 100 consistent with various embodiments. The filter assembly 100 generally has a particle filtration layer 110, a coalescing layer 120, and a growth media 130. In the current example, the filter assembly 100 is a filter element that is configured for installation in a filtration system.

The particle filtration layer 110 is generally configured to filter particles from a liquid stream, such as a liquid hydrocarbon stream including examples such as fuel and oil. In various embodiments, the particle filtration layer 110 is positioned upstream of the coalescing layer 120. In various embodiments, the particle filtration layer 110 is positioned upstream of the growth media. Specific example fibers and other materials in the particle filtration layer 110, as well as specific properties of the particle filtration layer 110 are described in more detail below.

The coalescing layer 120 is positioned downstream of the particle filtration layer 110 with respect to fluid flow through the filter assembly 100. The coalescing layer 120 can have one or more layers of coalescing media that is generally configured to coalesce a dispersed phase in a liquid hydrocarbon stream. In some embodiments the coalescing media is configured to coalesce water in a fuel stream. In some embodiments the coalescing media is configured to coalesce air in a hydraulic oil stream. The coalescing layer 120 is coupled to the particle filtration layer 110 in various embodiments. Specific example fibers and other materials in the coalescing layer 120, as well as specific properties of the coalescing layer 120 are described in more detail below.

The growth media 130 is a layer that is positioned downstream of the coalescing layer 120. In some embodiments, the growth media 130 is directly coupled to the coalescing layer 120. In some other embodiments, such as the one depicted, the growth media 130 is directly coupled to a support layer 122 that is directly coupled to the coalescing layer 120. Example support layers including materials that are used to construct example support layers are described in more detail below. In some other embodiments an additional support layer can be coupled to the particle filtration layer 110. The support layer can be coupled to the upstream side of the particle filtration layer 110 or the downstream side of the particle filtration layer 110 and can be in addition to, or an alternative to, the support layer 122 coupled to downstream side of the coalescing layer 120.

In the current example, the particle filtration layer 110, the coalescing layer 120, and the growth media 130, which are collectively referred to as the "filter media assembly" 104 for discussion of this figure, are layered in a series across a fluid flow pathway 102. The layers in the filter media assembly 104 are co-pleated to collectively define a plurality of pleats 140 extending between a first set of pleat folds 142 and a second set of pleat folds 144. The first set of pleat folds 142 defines a first face (also denoted by element number 142) and the second set of pleat folds 144 defines a second face (also denoted by element number 144). The first face 142 and the second face 144 are flow faces of the filter element, meaning that the fluid flow is directed therethrough for filtration purposes. In some other embodiments, the filter media assembly is a sheet of media wrapped in a spiraled configuration about the longitudinal axis x.

The particle filtration layer 110, coalescing layer 120 and growth media 130 collectively define a tubular structure. In particular, the first set of pleat folds 142 cumulatively define an outer circumferential limit 111a of the filter media assembly 104 and the second set of pleat folds 144 cumulatively define an inner circumferential limit 111b of the filter media assembly 104. In the current example, the inner circumferential limit 111b of the filter media assembly 104 is an inner radial boundary 119 (which is also the second set of pleat folds 144) of the filter media assembly 104. The outer circumferential limit 111a is an outer radial boundary 117 (which is also the first set of pleat folds 142).

In various examples, the filter assembly 100 has a central passageway 106, a first endcap 150 coupled to a first media end 112 of the filter media assembly 104, and a second endcap 152 coupled to a second media end 114 of the filter media assembly 104. The filter assembly 100 defines the fluid flow pathway 102, where the fluid flow pathway 102 extends through the filter media assembly 104. The filter media assembly 104 and the central passageway 106 share the central axis x, where the central axis x extends in a longitudinal direction (visible in FIG. 2A).

In some embodiments, a structural support 154 (such as a first structural support 154) can abut the filter media assembly 104 along its inner circumferential limit 111b. Indeed, in some embodiments, a structural support 156 (such as a second structural support 156) surrounds the outer circumferential limit 111a of the filter media assembly 104. The structural support 154, 156 is generally configured to provide mechanical support to the filter media assembly 104 to, for example, prevent collapsing of the filter media assembly 104 when subjected to forces resulting from liquid flow therethrough. The structural support 154, 156 generally does not exhibit a particle filtration efficiency and is more permeable than the filter media assembly 104. The structural supports 154, 156 can be a tubular metal or plastic support screen abutting the inner and/or outer circumferential boundary 111b/111a of the filter media assembly 104. In some embodiments one or both structural supports 154, 156 can be omitted.

As is visible in FIG. 2A, the first media end 112 of the filter media assembly 104 is coupled to a first endcap 150 and the second media end 114 of the filter media assembly 104 is coupled to a second endcap 152. The filter media assembly 104 defines the central passageway 106 extending from the first media end 112 to the second media end 114. In the current example, the central passageway 106 defines a portion of the fluid flow pathway 102. In the current example, the fluid flow pathway 102 extends through the second endcap 152 and through the second media end 114 of the filter media assembly 104.

The first endcap 150 is generally configured to retain the first media end 112 of the filter media assembly 104 and define a portion of the fluid flow pathway 102 through the filter media assembly 104. The first endcap 150 is coupled to the first media end 112. The first endcap 150 has a first media potting structure 123 that is configured to receive the first media end 112 of the filter media assembly 104. In some embodiments the first media potting structure 123 of the first endcap 150 is also configured to receive any structural supports 154, 156. The first media potting structure 123 is defined by an annular surface 124 abutting the first media end 112 of the filter media assembly 104, an inner tubular flange 125, and an outer tubular flange 126. The inner tubular flange 125 extends longitudinally from the annular surface 124 into the central passageway 106. The inner tubular flange 125 abuts the first structural support 154 of the filter media assembly 104. The outer tubular flange 126 extends longitudinally from the annular surface 124 abutting the second structural support 156. In various embodiments, the first media potting structure 123 and the first media end 112 of the filter media assembly 104 are bonded with an adhesive/sealant that is disposed in the first media potting structure 123.

The first endcap 150 has an outer circumferential sealing surface 128 about the longitudinal axis x that is configured to form a seal with filtration system components, which will be described in more detail, below. The outer circumferential sealing surface 128 shares the central axis x of the filter media assembly 104 and central passageway 106. The outer circumferential sealing surface 128 can be a circumferential cavity that is configured to receive an elastomeric component, such as an o-ring 127. In some embodiments the circumferential cavity is discontinuous, while in other embodiments the circumferential cavity is continuous.

The second endcap 152 is generally configured to retain the second media end 114 of the filter media assembly 104 and define a portion of the fluid flow pathway 102 through the filter media assembly 104. In the current example, the second endcap 152 defines a filter element outlet 151 of the fluid flow pathway 102. The second endcap 152 has a second media potting structure 134 that is configured to sealably receive the second media end 114 of the filter media assembly 104. The second media potting structure 134 is defined by an annular surface 132 abutting the second media end 114 of the filter media assembly 104 and an outer tubular flange 133. The outer tubular flange 133 extends longitudinally from the annular surface 132 over the outer radial boundary 117 of the second media end 114 of the filter media assembly 104. In various embodiments, the second media potting structure 134 and the second media end 114 of the filter media assembly 104 are bonded with an adhesive/sealant that is disposed in the second media potting structure 134.

It should be noted that the technology disclosed herein is not limited by the specific configurations of the endcaps of the filter assembly. Furthermore, various other filter assembly configurations may also be used. For example, while cylindrical filter elements disclosed herein are depicted and described as having an outside-in flow direction, in some other examples the filter assemblies can be configured to have an inside-out flow direction.

Figure 3A:
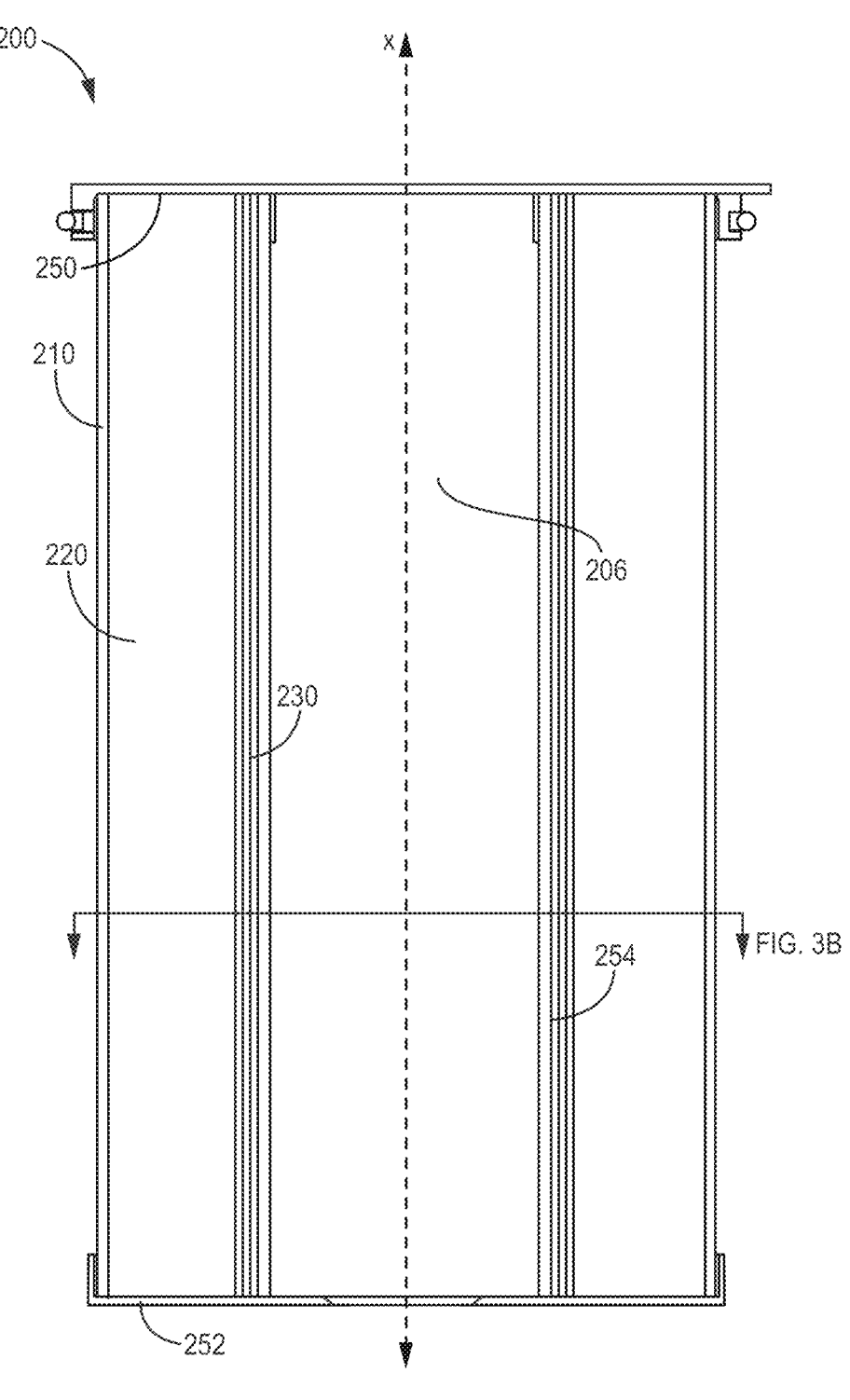
FIG. 3A is a first cross-sectional view of a second example filter assembly consistent with some embodiments.
Figure 3B:
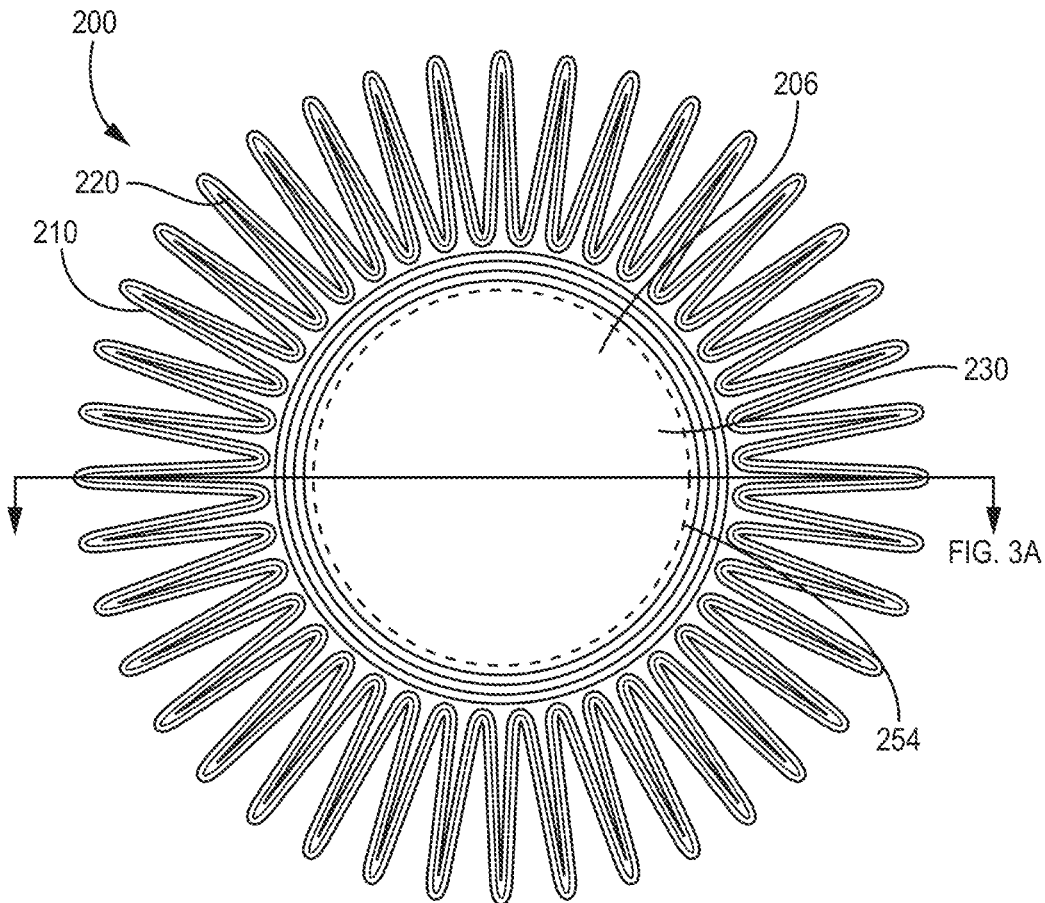
FIG. 3B is a second cross-sectional view consistent with the second example filter assembly of FIG. 3A.

FIG. 3A is a first cross section of another example configuration of a filter assembly 200 consistent with example implementations, and FIG. 3B is a second cross-section consistent with a filter assembly 200 of FIG. 3A. The filter assembly 200 is a filter element that is generally consistent with the discussion above with respect to the filter assembly discussed above with reference to FIGS. 2A-2B except where contradictory to the current description or corresponding figures. In the current example, a particle filtration layer 210 and a coalescing layer 220 are layered in a series and are co-pleated. The particle filtration layer 210 and the coalescing layer 220 collectively define a tubular structure having a central opening 206 similar to the example above. The growth media 230, however, forms a non-pleated tube within the central opening 206. The growth media 230 can be wrapped or coiled around an inner structural support 254, in some examples. In this example, the growth media 230, the particle filtration layer 210 and the coalescing layer 220 are collectively potted in a first endcap 250 and a second endcap 252 (visible in FIG. 3A) to form the filter assembly, however in some other implementations the growth media 230 can be separated from the endcaps.

Figure 4A:
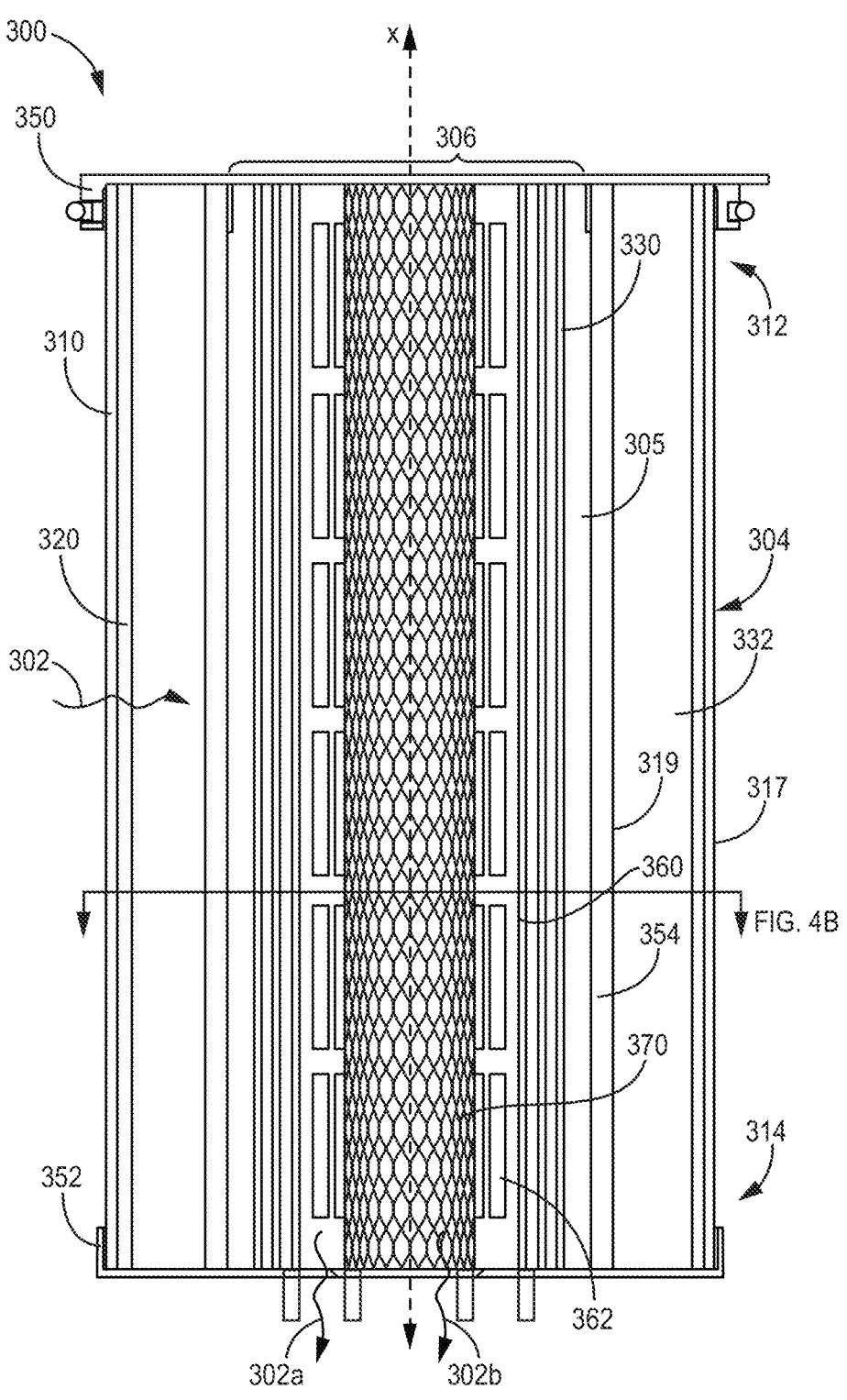
FIG. 4A is a first cross-sectional view of a third example filter assembly consistent with some embodiments.
Figure 4B:
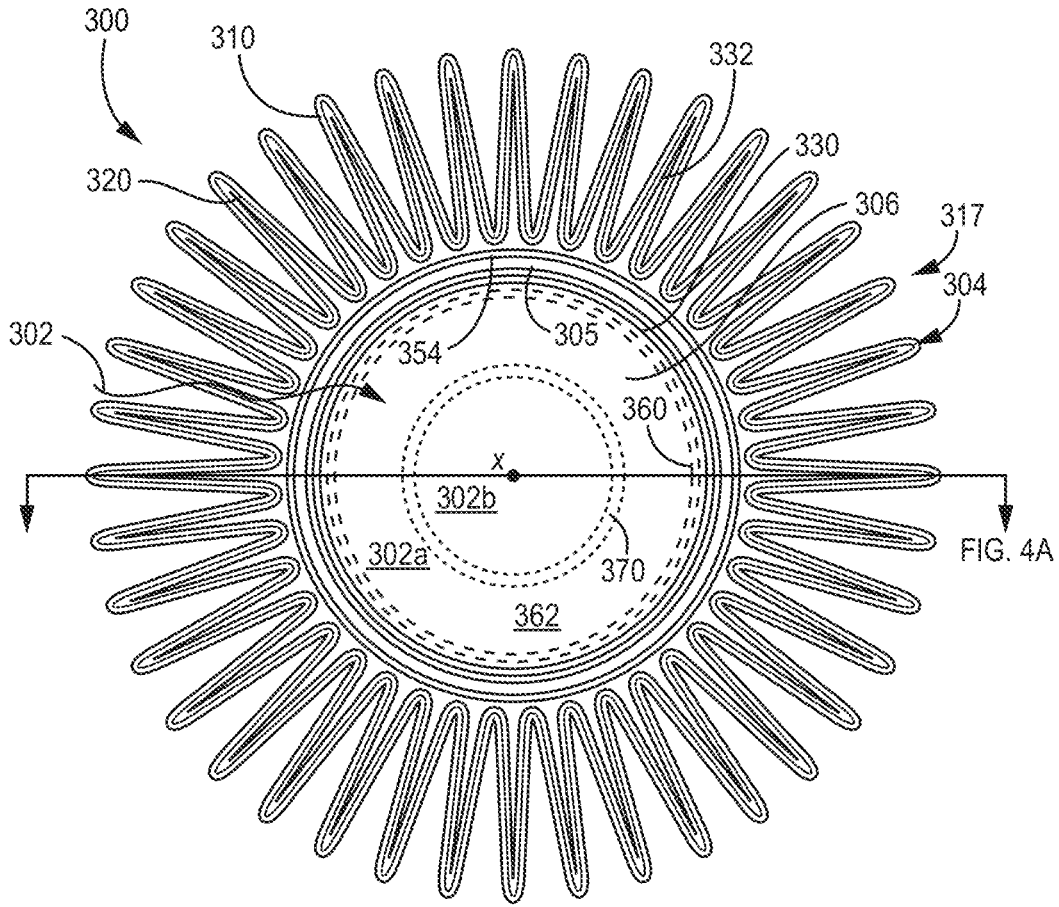
FIG. 4B is a second cross-sectional view consistent with the third example filter assembly of FIG. 4A.

FIG. 4A is a first cross-sectional view of yet another example configuration of a filter assembly 300 consistent with example implementations. FIG. 4B is a second cross-section of an example filter assembly 300 consistent with FIG. 4A. The filter assembly 300 generally has a particle filtration layer 310, a coalescing layer 320, and a growth media 330. The filter assembly 300 can be consistent with a filter element configured for installation in a filtration system.

The particle filtration layer 310 and the coalescing layer 320 have similar configurations to those discussed above in the discussions of FIGS. 2A-3B, except where contradictory to the current description or corresponding figures. In particular, the coalescing layer 320 is positioned downstream of the particle filtration layer 310. The coalescing layer 320 and the particle filtration layer 310 are pleated and collectively define a tubular structure having a central opening 306. In some embodiments, a support layer 332 can be coupled to one of the coalescing layer 320 or the particle filtration layer 310 or both of the coalescing layer 320 and the particle filtration layer 310. In such embodiments the support layer 332 can be pleated with the particle filtration layer 310 and the coalescing layer 320. The particle filtration layer 310, coalescing layer 320, and any support layers 332 can define a filter media assembly of the filter assembly. In the current example, the support layer 332 is coupled to the coalescing layer 320 and is positioned downstream of the coalescing layer 320.

In some embodiments, an inner structural support 354 can be positioned to abut an inner circumferential boundary 319 defining a first flow face of the filter media assembly 304. The inner structural support 354 can be omitted, however. In some embodiments, an outer structural support (not currently depicted) can be positioned to abut an outer circumferential boundary 317 defining a second flow face of the filter media assembly 304.

Similar to examples discussed above, the growth media 330 is positioned downstream of the coalescing layer 320. The growth media 330 is particularly positioned within the central opening 306 defined by the filter media assembly 304 and, in some embodiments, within the inner structural support 354. Unlike embodiments discussed above, however, in the current example a radial gap 305 is defined in the central opening 306 between the coalescing layer 320 and the growth media 330.

The filter assembly 300 can have an inner core 360 that is disposed within the central opening 306. The inner core 360 can be defined around the central axis x. The inner core 360 can be a permeable structural feature that is fixed to one or both of the endcaps 350, 352. The inner core 360 defines a portion of the fluid flow pathway 302. The inner core 360 can particularly be configured to receive fluid that has passed through the layers of filter media (for example, the particle filtration layer 310, the coalescing layer 320 and the growth media 330). As such, the inner core 360 is positioned downstream of the particle filtration layer 310, the coalescing layer 320 and the growth media 330.

In the current example, the growth media 330 is a sheet of filter material that is wrapped in a spiraled configuration around the inner core 360 to form multiple layers of growth media 330 arranged in a series across the fluid flow pathway 302. As such, the growth media 330 has a tubular structure. The growth media 330 can be coupled to the inner core 360, such as bonded to the length of the inner core 360 along an end of the growth media 330, and then coiled around the inner core 360.

In various examples, the filter assembly 300 has a central opening 306, a first endcap 350 coupled to a first media end 312 of the filter media assembly 304, and a second endcap 352 coupled to a second media end 314 of the filter media assembly 304 (visible in FIG. 4A). The filter assembly 300 defines the fluid flow pathway 302, where the fluid flow pathway 302 extends through the filter media assembly 304. The filter media assembly 304 and the central opening 306 share the central axis x, where the central axis x extends in a longitudinal direction.

In some embodiments, the filter assembly 300 is configured to maintain separation between the coalesced dispersed phase and the liquid hydrocarbon after filtration. In such embodiments, the filter assembly 300 defines two branches of the fluid flow pathway 302 downstream of the growth media 330: a coalesced pathway 302a and a separated hydrocarbon pathway 302b. In this example, a porous barrier 370 is disposed in the filter assembly 300 across the fluid flow pathway 302 downstream of the growth media 330. The porous barrier 370 is generally configured to obstruct the passage of the coalesced dispersed phase (such as water droplets or air pockets) of a minimum size while allowing the passage of the continuous phase (such as a liquid hydrocarbon). The coalesced pathway 302a extends out of the filter assembly 300 from a gap region 362 upstream of the porous barrier 370 and downstream of the growth media 330. The separated hydrocarbon pathway 302b extends downstream of the porous barrier 370 out of the filter assembly 300.

In the current example, the porous barrier 370 is a tubular screen structure that has a first end coupled to the first endcap 350 and the second end coupled to the second endcap 352. In some embodiments, the porous barrier 370 has a pleated tubular structure. Example constructions of the porous barrier 370, as well as specific properties of the porous barrier 370 are described in more detail below.

While the example filter assemblies depicted and discussed herein are cylindrical filter elements, it will be appreciated that the growth media discussed herein can be incorporated in filter assemblies having a variety of different configurations. For example, filter assemblies consistent with the technology disclosed herein can include panel filters. Multiple panel filters can be incorporated in such a filter assembly, where each panel filter is arranged in series with adjacent panel filters. In another example, a single panel filter can be used in such a filter assembly, where the particle filtration layer, coalescing layer, and growth media are arranged in a layered series across the fluid flow path defined by the panel filter.

Particle Filtration Layer

The particle filtration layer can be constructed of a variety of materials and combinations of materials known in the art. The particle filtration layer can be a single layer or multiple layers of filter media.

The particle filtration layer can generally be constructed of media fibers and a binder. "Media fibers" is defined herein as fibers that provide functional filtration properties to the layer. The media fiber may be, for example, glass fiber, carbon fiber, ceramic fibers, polyester or natural cellulose. A substantial proportion of glass fiber can be used in some example implementations of the particle filtration layer. In addition to glass fibers, alternative fibers suitable in some implementations for the media fiber comprise carbon fibers, natural cellulose fibers, and/or polyester fibers. In some embodiments the media fibers are staple fibers. Generally suitable carbon fibers should have an average diameter of less than 25 microns, more desirably less than 15 microns, and preferably less than 10 microns. Commercial sources for suitable carbon materials include the following: Unitika, Kynol, and others.

In embodiments, the particle filtration layer contains glass fibers in an amount corresponding to about 10% to 90% by weight of the total solids in the particle filtration layer, or about 20 to 80% by weight of the total solids in the particle filtration layer, or about 25% to 75% by weight of the total solids in the particle filtration layer, or about 50% by weight of the total solids in the particle filtration layer. In some embodiments, a blend of more than one source of glass fiber is employed, wherein the blend of more than one source of glass fiber is employed to form the total weight percent of glass fiber in the particle filtration layer. In some such embodiments, the blend of glass fiber sources is selected to control the permeability of the particle filtration layer. For example, in some embodiments, combining glass fibers from more than one source of glass fiber having an average fiber diameter of about 0.3 to 0.5 micrometer, glass fiber having an average fiber diameter of about 1 to 2 micrometers, glass fiber having an average fiber diameter about 3 to 6 micrometers, glass fiber with a fiber diameter of about 6 to 10 micrometers, and glass fiber with fiber diameter of about 10 to 100 micrometers in varying proportions, including blends of two or more thereof, increases the permeability of the particle filtration layer. In some such embodiments, the glass fiber blends are selected to impart a controlled pore size, resulting in a defined permeability, to a particle filtration layer.

The particle filtration layer also generally has a binder. In some embodiments, the binder can be a non-fibrous resin. Typically, the binder is a binder fiber, such as bicomponent fibers, which has been discussed above with reference to the filter material. In such embodiments the particle filtration layer can lack a non-fibrous resin.

The performance properties of the particle filtration layer are impacted by controlling attributes relating to the fiber size, pore structure, solidity, and compressibility of the particle filtration layer. Generally, the use of a media that has relatively low solidity and low compressibility, while also having a relatively small mean flow pore size but a relatively large maximum flow pore size, results in an example media construction that can remove particulates without premature plugging. In some embodiments the particle filtration layer is hydrophilic in air, meaning that a water droplet, in air, has a contact angle with the surface of the filtration layer of less than 90 degrees, when measured using a standard contact angle measurement device such as the First Ten Angstroms contact angle instrument. The hydrophilicity of the particle filtration layer 110 can distinguish from traditional melt-blown materials that can be used for particle filtration in fuels, which tend to be hydrophobic in air. "Hydrophobic in air" generally means that a water droplet, in air, has a contact angle with the surface of a media that is greater than 90 degrees.

In some embodiments, the particle filtration layer has a relatively low solidity level. In a typical implementation, solidity of the particle filter layer is less than 15 percent, more typically less than 12 percent, and more frequently less than 10 percent. In certain embodiments the solidity is less than 9 percent, less than 8 percent, or less than 7 percent. The particle filtration layer generally has an air permeability ranging from about 45 $ft^3/min\text{-}ft^2$ to about 200 $ft^3/min\text{-}ft^2$.

In some embodiments, a non-fibrous binder resin can be used to help bond the media fiber, and optionally the binder fiber, into a mechanically stable particle filtration layer. Such thermoplastic binder resin materials can be used as a dry powder or solvent system but are typically aqueous dispersions of vinyl thermoplastic resins. A non-fibrous resin is not necessary to obtain adequate strength for the particle filtration layer but can be used.

Coalescing Layer

The coalescing layer is generally positioned upstream of the growth media and positioned downstream of the particle filtration layer. The coalescing layer can be configured consistently with coalescing layers generally known in the art. The coalescing layer can incorporate media fibers and a binder. In some embodiments the coalescing layer lacks bi-component fibers.

The coalescing layer can have an average fiber diameter ranging from about 0.3 μm to about 10 μm, or from about 0.69 μm to about 7.5 μm. The coalescing layer generally can have a thickness ranging from about 0.3 mm to about 1.0 mm, when measured at 8 psi (55.1 kPa). In some embodiments the coalescing layer can have a thickness ranging from about 0.4 mm to about 0.7 mm when measured at 8 psi (55.1 kPa). The coalescing layer is generally constructed to have a basis weight ranging from about 50 $g/m^2$ to about 150 $g/m^2$, or from about 80 $g/m^2$ to about 115 $g/m^2$. In some embodiments, the coalescing layer can have a basis weight that is higher than the basis weight of the particle filtration layer. The coalescing layer can have an air permeability that is less than the air permeability of the particle filtration layer. In some embodiments, the coalescing layer has an air permeability that ranges from about 3 $ft^3/min\text{-}ft^2$ to about 70 $ft^3/min\text{-}ft^2$. In some particular embodiments, the coalescing layer has an air permeability range of 10 $ft^3/min\text{-}ft^2$ to 40 $ft^3/min\text{-}ft^2$.

In a variety of embodiments, the coalescing layer is a wet-laid media. The coalescing layer can be substantially constructed of fibers, a surface treatment, and a binder material, meaning that the coalescing layer is at least 95%, 98% or 100% by weight fibers, the surface treatment, and the binder material. In some embodiments the coalescing layer is a nonwoven fibrous mat coated with a surface treatment, where the fibers are bonded with a binder material. The surface treatment is generally configured to modify the surface energy of the fibers therein, and the binder material is generally configured to bond the fibers of the coalescing layer.

The fibers of the coalescing layer can be a variety of types of fibers and combinations of fibers and are generally non-woven. The fibers of the coalescing layer can be glass fibers, natural fibers, synthetic fibers, polymeric fibers, ceramic fibers, metallic fibers, carbon fibers, and combinations thereof. Other types of fibers are certainly contemplated. In some embodiments the coalescing layer has glass fibers and polyester fibers. The fibers can be from 50% to 95% by weight of the coalescing layer. In some embodiments, the coalescing layer is at least 70% by weight glass fibers. In some embodiments the coalescing layer is at least 85% by weight glass fibers.

The surface treatment is generally configured to change the surface properties of the fibers within the coalescing layer. The surface treatment can have a variety of configurations and compositions, and in some embodiments the surfaces treatment is a compound that contains fluorine. One example surface treatment that can be used on the fibers of the coalescing layer is a polytetrafluoroethylene dispersion. Some other example surface treatments are fluoroalkyl acrylate polymers, perfluoroalkyl methylacrylate copolymers, fluorinated hydrocarbons, fluoroacrylate polymers, fluoroalkyl methacrylate polymers, perfluoroalkoxy polymer (PFA), fluorinated ethylene-propylene (FEP). The surface treatment can range from 0.01% to 25% of the coalescing layer by weight. In some embodiments the surface treatment is from 5%-20% or 10%-15% of the coalescing layer by weight.

The binder material is generally configured to bind the fibers in the coalescing layer. The binder material can be an acrylic resin or an epoxy, as examples. In some particular examples the binder material is an acrylic latex binder. In some examples the binder material is a styrene/acrylonitrile copolymer resin. The binder material can be an emulsion polymer, resins, epoxies, solution polymers, styrene-acrylates, styrene-butadiene, acrylics, vinyl acetates, acrylonitriles, urethanes, urea formaldehyde, melamine formaldehyde, acidified acrylates, polyvinyl alcohol, and combinations thereof. In an embodiment, the binder material can have a polymer that has been modified to comprise one or more functional groups. For example, the polymer may be functionalized to contain additional carboxylates. The coalescing layer can be 3% to about 40% binder material by weight, alternatively from about 5% to about 25% binder material by weight, or from about 10% to about 20% binder material by weight.

Support Layer

Some embodiments of filter elements disclosed herein have a support layer. The support layer can be coupled to one of the particle filtration layer, the coalescing layer, or both. In some embodiments the support layer is positioned upstream of the particle filtration layer and coupled to the particle filtration layer. In some embodiment the support layer that is positioned downstream of the coalescing layer and is coupled to the coalescing layer. In yet other embodiments the support layer is positioned between the particle filtration layer and the coalescing layer and is coupled to both the particle filtration layer and the coalescing layer. The support layer can be constructed of a variety of materials and combinations of materials but is generally configured to provide structural support to the particle filtration layer and the coalescing layer. In some embodiments where the support layer is positioned downstream of the coalescing layer, the support layer can be configured to allow coalesced dispersed phase to exit the filter material relatively intact and prevent emulsification of the coalesced dispersed phase from the coalescing layer.

In some embodiments, the support layer is bicomponent fibers. In some such embodiments the bicomponent fibers are substantially continuous polyester fibers having a nylon sheath, such as Colback® supplied by Bonar Inc., based in Asheville, North Carolina. In some other embodiments, the support layer is a cellulosic material. In some embodiments the support layer is a scrim, such as a non-woven polyester scrim. In some embodiments the polyester scrim is Reemay supplied by Polymer Group, Inc. based in Charlotte, North Carolina. The support layer can be a combination of materials such as natural cellulose and polyester. In some embodiments the support layer is a wire mesh. Other materials are certainly contemplated for the support layer.

The support layer can also have one or more binding materials. For example, in some embodiments the support layer is saturated with a phenolic resin, or any other type of binder. The support layer can also be treated with one or more compositions to adjust properties of the support layer. In some embodiments the support layer has a basis weight ranging from about 17 g/m$^2$ to about 200 g/m$^2$. The support layer generally has an air permeability ranging from 200 ft$^3$/min-ft$^2$ to about 1000 ft$^3$/min-ft$^2$.

It will be appreciated that the support layer can contain fiber having an average diameter or other average maximum cross-sectional dimension (such as a diagonal) greater than the average diameter of the media fiber in the particle filtration layer.

Porous Barrier

As mentioned above, the porous barrier configured to obstruct the passage of the coalesced dispersed phase (such as water droplets or air pockets) of a minimum size while allowing the passage of the continuous phase (such a liquid hydrocarbon). The porous barrier can be formed by one or more layers of material that can be woven, molded and/or wet laid, for example. In some embodiments, the porous barrier is a screen material defining openings having a smaller dimension than the minimum size coalesced dispersed phase (water droplets or air pockets) the porous barrier is configured to obstruct. The surface of the screen can be hydrophobic, such as in implementations where the porous barrier is used to obstruct coalesced water.

The openings may be uniformly sized or nonuniform, including openings of various sizes. The pores of the porous barrier may also be referred to as screen openings and are understood to mean holes (for example through holes) in the barrier. Pore size may be determined by ASTM E11 or by optical imaging. The porous barrier may include openings sized 5 μm or greater, 10 μm or greater, 15 μm or greater, or 20 μm or greater. The porous barrier may include openings sized 1 mm or smaller, 750 μm or smaller, 500 μm or smaller, 250 μm or smaller, 200 μm or smaller, 150 μm or smaller, or 100 μm or smaller. In one example, the porous barrier includes openings sized from 10 μm to 250 μm, from 15 μm to 200 μm, or from 20 μm to 150 μm. In one example, the porous barrier is a 100 μm screen that is configured to obstruct coalesced water droplets having a diameter larger than 100 μm. In some embodiments, the openings of the porous barrier are uniform in size (e.g., have a narrow pore size distribution). For example, in some embodiments, at least some openings, a majority of openings, at least 90% of openings, at least 95% of openings, or at least 99% of openings of the porous barrier are within the size ranges specified here, as determined by total opening area of the porous barrier. The values listed here are determined by optical imaging. In one embodiment, substantially all of the openings of the porous barrier are within the size ranges specified here.

The openings of the porous barrier may have any suitable shape. For example, the openings may be rectangular, square, round, oval, or any other suitable shape. The shape may be determined by viewing the porous barrier from a direction perpendicular to the plane of the porous barrier. In some embodiments, the openings of the porous barrier are uniform in shape. For example, in some embodiments, at least some openings, a majority of openings, at least 90% of openings, at least 95% of openings, or at least 99% of openings of the porous barrier have the same shape (e.g., are rectangular, square, round, oval, etc.).

The porous barrier may be made of a woven or non-woven material. For example, the porous barrier may be made of a woven mesh. The woven mesh may have a fiber or wire diameter (or maximum cross dimension for a non-circular fiber or wire) of 0.01 mm or greater, 0.05 mm or greater, or 0.1 mm or greater. The woven mesh may have a wire diameter (or maximum cross dimension) of 10 mm or less, 2 mm or less, 1 mm or less, or 0.5 mm or less. For example, the woven mesh may have a wire diameter (or cross dimension) of 0.05 mm to 2 mm. In one embodiment, the porous barrier includes a pleated material, such as a pleated woven mesh.

The porous barrier may be constructed of any suitable material. For example, the porous barrier may be constructed of a material with suitable oleophilicity/oleophobicity to encourage further growth of air cavities and to allow air cavities to pass through the barrier. In some embodiments, the porous barrier or a part of the porous barrier is oleophobic. According to some embodiments, at least one side of the porous barrier is oleophilic. In some embodiments, the porous barrier exhibits an oleophobicity gradient, where the upstream side of the barrier is more oleophobic than the downstream side. Oleophobicity of a material may be expressed as an oleophobic rating measured according to AATCC method 118. The porous barrier may have an oleophobic rating of 1 or greater, 1.5 or greater, or 2 or greater. The porous barrier may have an oil rating of 8 or less or 6 or less. The porous barrier may be constructed from a composite material. The porous barrier may be a composite of oleophilic and oleophobic components. Oleophobic components have an oleophobic rating of 1 or greater.

The porous barrier may be constructed of metal, such as stainless steel. The porous barrier may be constructed of woven or non-woven media made from one or more of natural cellulose; regenerated cellulose (e.g., rayon); synthetic materials such as polyamide, polyester, polyethersulfone (PES), polypropylene (PP), polyethylene (PE), polytetrafluoroethylene (PTFE), polyvinylidene difluoride (PVDF); glass; ceramic; or carbon fiber. In embodiments, the porous barrier includes a woven metallic mesh, such as stainless steel mesh. In some embodiments, the fibers (for example metallic fibers) are coated. Polymeric or non-polymeric coatings, such as resins, may be used.

The porous barrier can be arranged in a cylindrical shape downstream of the growth media. In some embodiments, the porous barrier at least partially surrounds (e.g., nested with) the growth media. In some embodiments the growth media at least partially surrounds the porous barrier. In some embodiments, the porous barrier has another geometric configuration, such as a planar or substantially planar sheet or a pleated sheet, or is constructed from two or more planar sheets or pleated sheets. A sheet or pleated sheet may be configured as a panel. Such panel configurations may be arranged, for example, inside the tank.

The porous barrier may exhibit microtexture and macrotexture. Microtexture is used here to refer to the surface texture of the barrier at the level of individual fibers or wires that make up the barrier (e.g., referring to variations smaller than 1 mm in size). Microtexture may also be referred to as surface roughness. Macrotexture is used here to refer to the surface texture of the barrier overall (e.g., referring to variations greater than 1 mm in size). The porous barrier may exhibit surface roughness. For example, porous barrier may have a surface roughness of 1 nm or greater, 10 nm or greater, 25 nm or greater, 50 nm or greater, or 100 nm or greater. The porous barrier may have a surface roughness of 1000 nm or less, 500 nm or less, or 200 nm or less. For example, the porous barrier may have a surface roughness of 10 nm to 500 nm. In some embodiments, the porous barrier has little or no macrotexture, i.e., the porous barrier is "smooth," with the exception that the porous barrier may be pleated.

Additional characterizations for the porous barrier surface include skewness, kurtosis, and radius of curvature. The skewness of the fibers may be at least −10 or greater, −8 or greater, or −6 or greater. The skewness of the fibers may be 6 or less, 8 or less, or 10 or less. The fibers of the porous barrier may have a kurtosis of −10 or greater, −8 or greater, or −6 or greater. The fibers of the porous barrier may have a kurtosis of 6 or less, 8 or less, or 10 or less. Combinations of certain surface roughness, skewness, and kurtosis may result in favorable capture properties. For example, high roughness and high kurtosis may be beneficial to capture. The fibers of the porous barrier may have a radius of curvature may be up to 2 nm, up to 5 nm, up to 10, up to 50, up to 100, or up to 500 nm.

The porous barrier may have an initial, clean differential pressure of 0.01 psi (68.9 Pa) or less, 1 psi (6.89 kPa) or less, or 100 psi (689.5 kPa) or less, per ISO 16889 run at a suitable face velocity, for example at 0.5 cm/sec.

EXEMPLARY EMBODIMENTS

Embodiment 1. A filter material comprising: binder fibers; and irregular rayon fibers distributed among the binder fibers, wherein the filter material lacks non-fibrous resin.

Embodiment 2. The filter material of any one of embodiments 1 and 3-12, having an air permeability between 100-500 $ft^3$-$min^{-1}$-$ft^{-2}$at 125 Pa.

Embodiment 3. The filter material of any one of embodiments 1-2 and 4-12, further comprising fibrillated rayon fibers.

Embodiment 4. The filter material of any one of embodiments 1-3 and 5-12, having a thickness of at least 0.25 mm.

Embodiment 5. The filter material of any one of embodiments 1-4 and 6-12, wherein the filter material is up to 70% by weight polyester fibers.

Embodiment 6. The filter material of any one of embodiments 1-5 and 7-12, wherein the filter material is 30% to 75% by weight rayon fibers.

Embodiment 7. The filter material of any one of embodiments 1-6 and 8-12, wherein the filter material lacks a support layer.

Embodiment 8. The filter material of any one of embodiments 1-7 and 9-12, wherein the filter material lacks glass.

Embodiment 9. The filter material of any one of embodiments 1-8 and 10-12, wherein the filter material comprises natural cellulose fibers.

Embodiment 10. The filter material of any one of embodiments 1-9 and 11-12, wherein the irregular rayon fibers are multi-lobed rayon fibers.

Embodiment 11. The filter material of any one of embodiments 1-10 and 12, wherein the irregular rayon fibers have a linear mass density from 1 den to 7 den.

Embodiment 12. The filter material of any one of embodiments 1-11, having a plurality of low-resistance flow paths through the filter material.

Embodiment 13. A filter assembly comprising: a particle filtration layer; a coalescing layer downstream of the particle filtration layer, wherein the coalescing layer is coupled to the particle filtration layer; and a growth media downstream of the coalescing layer comprising: irregular rayon fibers; and binder fibers distributed among the irregular rayon fibers, wherein the growth media lacks non-fibrous resin.

Embodiment 14. The filter assembly of any one of embodiments 13 and 15-29, wherein the particle filtration layer, coalescing layer, and growth media are pleated and collectively define a tubular structure.

Embodiment 15. The filter assembly of any one of embodiments 13-14 and 16-29, wherein the particle filtration layer and coalescing layer are pleated and collectively define a tubular structure having a central opening, and wherein the growth media forms a non-pleated tube within the central opening.

Embodiment 16. The filter assembly of any one of embodiments 13-15 and 17-29, wherein the particle filtration layer and coalescing layer are pleated and collectively define a tubular structure having a central opening, and the growth media is pleated and defines a tubular structure, and wherein a radial gap is defined between the growth media and the coalescing layer.

Embodiment 17. The filter assembly of any one of embodiments 13-16 and 18-29, further comprising a porous barrier downstream of the growth media.

Embodiment 18. The filter assembly of embodiment 17, wherein the porous barrier forms a tubular structure.

Embodiment 19. The filter assembly of any one of embodiments 13-18 and 20-29, wherein the growth media has an air permeability between 100-500 $ft^3$-$min^{-1}$-$ft^{-2}$at 125 Pa.

Embodiment 20. The filter assembly of any one of embodiments 13-19 and 21-29, the growth media further comprising fibrillated rayon fibers.

Embodiment 21. The filter assembly of any one of embodiments 13-20 and 22-29, the growth media having a thickness of at least 0.4 mm.

Embodiment 22. The filter assembly of any one of embodiments 13-21 and 23-29, wherein the growth media is up to 70% by weight polyester fibers.

Embodiment 23. The filter assembly of any one of embodiments 13-22 and 24-29, wherein the growth media is 40% to 75% by weight rayon fibers.

Embodiment 24. The filter assembly of any one of embodiments 13-23 and 25-29, wherein the growth media lacks a support layer.

Embodiment 25. The filter assembly of any one of embodiments 13-24 and 26-29, wherein the growth media lacks glass.

Embodiment 26. The filter assembly of any one of embodiments 13-25 and 27-29, wherein the growth media comprises natural cellulose fibers.

Embodiment 27. The filter assembly of any one of embodiments 13-26 and 28-29, wherein the irregular rayon fibers are multi-lobed rayon fibers.

Embodiment 28. The filter assembly of any one of embodiments 13-27 and 29, wherein the irregular fibers have a linear mass density from 1 den to 7 den.

Embodiment 29. The filter assembly of any one of embodiments 13-28, the growth media defining a plurality of low-resistance flow paths through the growth media.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A filter material comprising:
  binder fibers;
  irregular rayon fibers distributed among the binder fibers; and
  fibrillated rayon fibers, wherein the filter material lacks non-fibrous resin, wherein the filter material is 30% to 75% by weight total rayon fibers including at least the irregular rayon fibers and the fibrillated rayon fibers.

2. The filter material of claim 1, having an air permeability between 100-500 ft$^3$-min$^{-1}$-ft$^{-2}$ at 125 Pa.

3. The filter material of claim 1, having a thickness of at least 0.25 mm.

4. The filter material of claim 1, further comprising polyester fibers, wherein the filter material is up to 70% by weight polyester fibers.

5. The filter material of claim 1, wherein the filter material lacks a support layer.

6. The filter material of claim 1, wherein the filter material lacks glass.

7. The filter material of claim 1, wherein the filter material comprises natural cellulose fibers.

8. The filter material of claim 1, wherein the irregular rayon fibers are multi-lobed rayon fibers.

9. The filter material of claim 1, wherein the irregular rayon fibers have a linear mass density from 1 den to 7 den.

10. The filter material of claim 1, having variations in flow resistance through the filter material across a surface area of the filter material.

11. A filter assembly comprising:
  a particle filtration layer;
  a coalescing layer downstream of the particle filtration layer, wherein the coalescing layer is coupled to the particle filtration layer; and
  a growth media downstream of the coalescing layer, the growth media is filter material comprising:
    irregular rayon fibers;
    binder fibers distributed among the irregular rayon fibers, wherein the filter material lacks non-fibrous resin; and
    fibrillated rayon fibers, wherein the filter material is 30% to 75% by weight total rayon fibers including at least the irregular rayon fibers and the fibrillated rayon fibers.

12. The filter assembly of claim 11, wherein the particle filtration layer, coalescing layer, and growth media are pleated and collectively define a tubular structure.

13. The filter assembly of claim 11, wherein the particle filtration layer and coalescing layer are pleated and collectively define a tubular structure having a central opening, and wherein the growth media forms a non-pleated tube within the central opening.

14. The filter assembly of claim 11, wherein the particle filtration layer and coalescing layer are pleated and collectively define a tubular structure having a central opening, and the growth media is pleated and defines a tubular structure, and wherein a radial gap is defined between the growth media and the coalescing layer.

15. The filter assembly of claim 11, further comprising a porous barrier downstream of the growth media.

16. The filter assembly of claim 15, wherein the porous barrier forms a tubular structure.

* * * * *